(12) United States Patent
Smith et al.

(10) Patent No.: US 12,513,153 B2
(45) Date of Patent: Dec. 30, 2025

(54) DECENTRALIZED DATA SUPPLY CHAIN PROVENANCE

(71) Applicant: Intel Corporation, Santa Clara, CA (US)

(72) Inventors: Ned M. Smith, Beaverton, OR (US); Kshitij Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 1076 days.

(21) Appl. No.: 17/032,790

(22) Filed: Sep. 25, 2020

(65) Prior Publication Data
US 2021/0012282 A1 Jan. 14, 2021

(51) Int. Cl.
| | |
|---|---|
| *H04L 9/40* | (2022.01) |
| *G06F 16/23* | (2019.01) |
| *G06F 16/27* | (2019.01) |
| *G06F 21/57* | (2013.01) |
| *G06F 21/62* | (2013.01) |
| *H04L 9/00* | (2022.01) |

(Continued)

(52) U.S. Cl.
CPC .......... *H04L 63/12* (2013.01); *G06F 16/2379* (2019.01); *G06F 16/27* (2019.01); *G06F 21/57* (2013.01); *G06F 21/6245* (2013.01); *H04L 9/3239* (2013.01); *H04L 9/3265* (2013.01); *H04L 9/50* (2022.05); *G06Q 10/0838* (2013.01)

(58) Field of Classification Search
CPC ..... H04L 63/12; H04L 9/3239; H04L 9/3265; H04L 9/50; G06F 16/2379; G06F 16/27; G06F 21/57; G06F 21/6245; G06Q 10/0838

See application file for complete search history.

(56) References Cited

U.S. PATENT DOCUMENTS

| | | |
|---|---|---|
| 5,826,239 A | 10/1998 | Du et al. |
| 5,941,947 A | 8/1999 | Brown et al. |
| 7,039,701 B2 | 5/2006 | Wesley |

(Continued)

OTHER PUBLICATIONS

Netherlands Patent Office, "Search report," issued in connection with Patent application No. 2029032, on Mar. 1, 2022, 7 pages.

(Continued)

*Primary Examiner* — Cheng-Feng Huang
(74) *Attorney, Agent, or Firm* — Hanley, Flight & Zimmerman, LLC

(57) ABSTRACT

Apparatus, systems, articles of manufacture, and methods are disclosed for generating a data supply chain object. An example non-transitory computer readable storage medium disclosed herein includes data which may be configured into executable instructions and, when configured and executed, cause one or more processors to at least: derive a provenance of a first data supply chain object; identify a first stakeholder from the provenance; determine if the first stakeholder is verified; utilize data associated with the data supply chain when the first stakeholder is verified; build a tag-value structure based on the utilization of the data; build a second data supply chain object based on the tag-value structure and an identity of a second stakeholder; and add the second data supply chain object to the data supply chain.

20 Claims, 22 Drawing Sheets

(51) Int. Cl.
*H04L 9/32* (2006.01)
*G06Q 10/083* (2023.01)

(56) References Cited

U.S. PATENT DOCUMENTS

| | | | |
|---|---|---|---|
| 7,206,934 | B2 | 4/2007 | Pabla et al. |
| 7,207,041 | B2 | 4/2007 | Elson et al. |
| 7,251,689 | B2 | 7/2007 | Wesley |
| 8,356,067 | B2 | 1/2013 | Trantow |
| 8,656,189 | B2 | 2/2014 | Orsini et al. |
| 9,779,269 | B1 | 10/2017 | Perlman |
| 9,928,264 | B2 | 3/2018 | Lomet et al. |
| 10,244,071 | B2 | 3/2019 | Moustafa et al. |
| 2003/0217139 | A1 | 11/2003 | Burbeck et al. |
| 2015/0121371 | A1 | 4/2015 | Gummaraju et al. |
| 2018/0041345 | A1* | 2/2018 | Maim ............... H04L 9/32 |
| 2018/0367637 | A1 | 12/2018 | Balazinski et al. |
| 2019/0102577 | A1 | 4/2019 | Gueron et al. |
| 2019/0236562 | A1 | 8/2019 | Padmanabhan |
| 2019/0253244 | A1 | 8/2019 | Hamel et al. |
| 2019/0260592 | A1* | 8/2019 | Nguyen ............... H04L 9/0643 |
| 2020/0036712 | A1* | 1/2020 | Soundararajan ........ H04L 63/12 |
| 2020/0084202 | A1 | 3/2020 | Smith et al. |
| 2020/0136799 | A1 | 4/2020 | Smith et al. |
| 2020/0136906 | A1 | 4/2020 | Guim Bernat et al. |
| 2020/0167196 | A1 | 5/2020 | Smith et al. |
| 2020/0167205 | A1 | 5/2020 | Guim Bernat et al. |
| 2020/0301894 | A1* | 9/2020 | Heo ............... H04L 63/1416 |
| 2021/0144517 | A1 | 5/2021 | Guim Bernat et al. |
| 2022/0006651 | A1* | 1/2022 | Soundararajan .... H04W 12/069 |
| 2022/0103369 | A1* | 3/2022 | Adams ............... H04L 9/3234 |

OTHER PUBLICATIONS

Netherland Patent Office, "Patent Certificate," issued in connection with Netherland Patent Application No. 2029032, mailed on Jun. 29, 2022, 120 Pages. [Machine English Translation Included].

* cited by examiner

DECENTRALIZED DATA SUPPLY CHAIN PROVENANCE

FIELD OF THE DISCLOSURE

This disclosure relates generally to data processing, and, more particularly, to decentralized data supply chain provenance.

BACKGROUND

A blockchain is a list of blocks or records that are linked using cryptography. Each block in a blockchain may include a hash of previous blocks, a timestamp, and transaction data. A blockchain may be managed by a peer-to-peer network that adheres to a protocol for internode communication and validation of new blocks into the chain. A blockchain provides a decentralized, distributed and often public digital ledger to record transactions across many computers.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Descriptors such as "first," "second," "third," etc., are used herein when identifying multiple elements or components which may be referred to separately. Unless otherwise specified or understood based on their context of use, such descriptors are not intended to impute or otherwise indicate any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

Edge computing, at a general level, refers to the transition of cloud or cloud-like compute and storage resources closer to endpoint devices (e.g., consumer computing devices, user equipment, etc.) in order to optimize total cost of ownership, reduce application latency, improve service capabilities, and improve compliance with data privacy or security requirements. Edge computing may, in some scenarios, provide a cloud-like distributed service that offers orchestration and management for applications among many types of storage and compute resources. As a result, some implementations of edge computing have been referred to as the "edge cloud" or the "fog," as powerful computing resources previously available only in large remote data centers are moved closer to endpoints and made available for use by consumers at the "edge" of the network.

Disclosed herein are example data supply chain (DSC) objects that enable data protection, enforcement of rights, and/or compensation compliance. For example, using the example DSC objects disclosed herein allows artists and/or content creators to be able to keep track of their intellectual property rights in a distributed and decentralized data ecosystem. In some examples, the use of the DSC objects disclosed herein allows media owners to independently audit inferences generated by AI-driven entities. Some examples disclosed herein do not require a centralized control authority in which members must participate, thereby resulting in a flexible governance model that can be customized to local or municipal needs. The examples disclosed herein further enable data protection in an edge environment.

Figure 1:
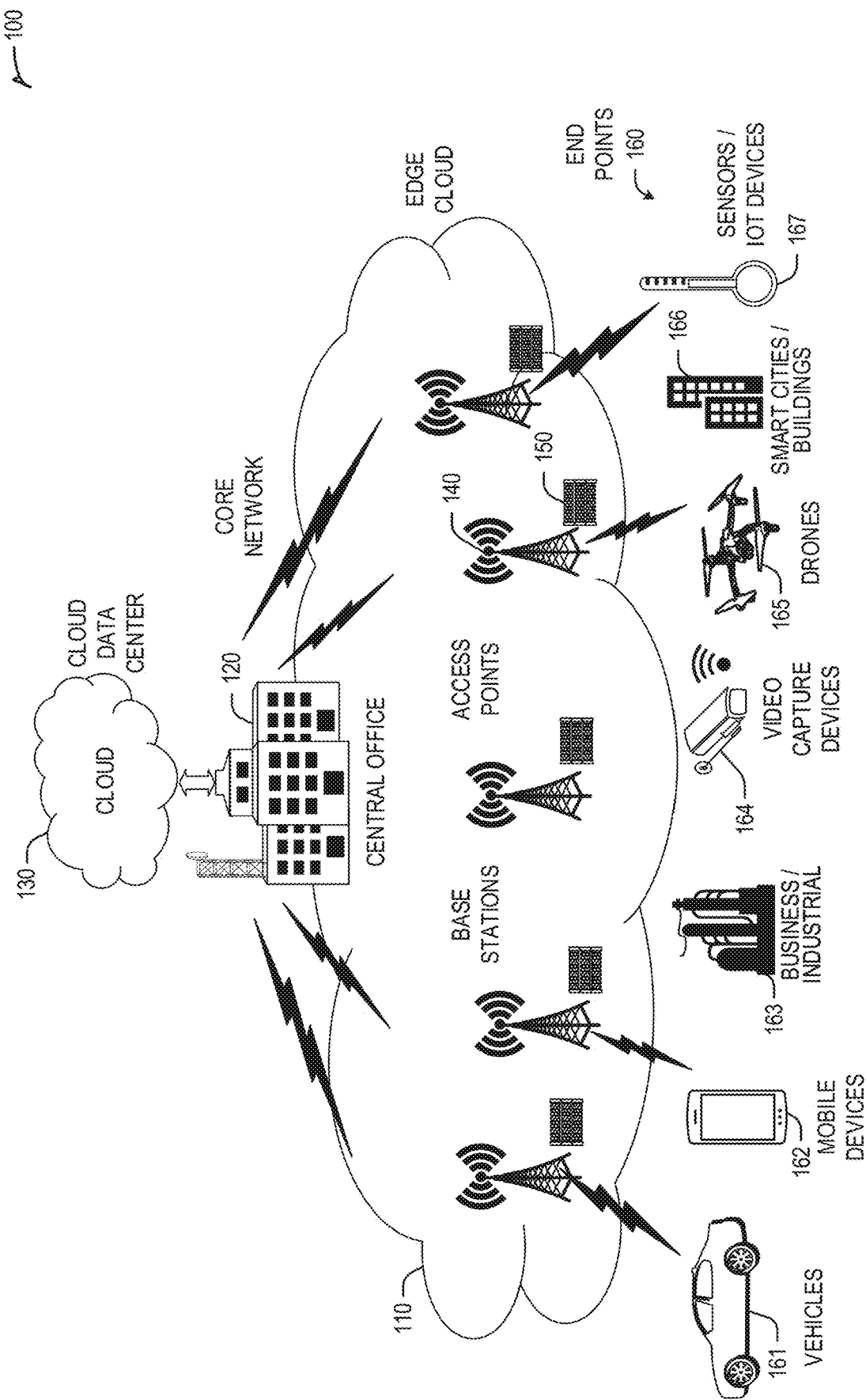
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and Internet of Thing (IoT) devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
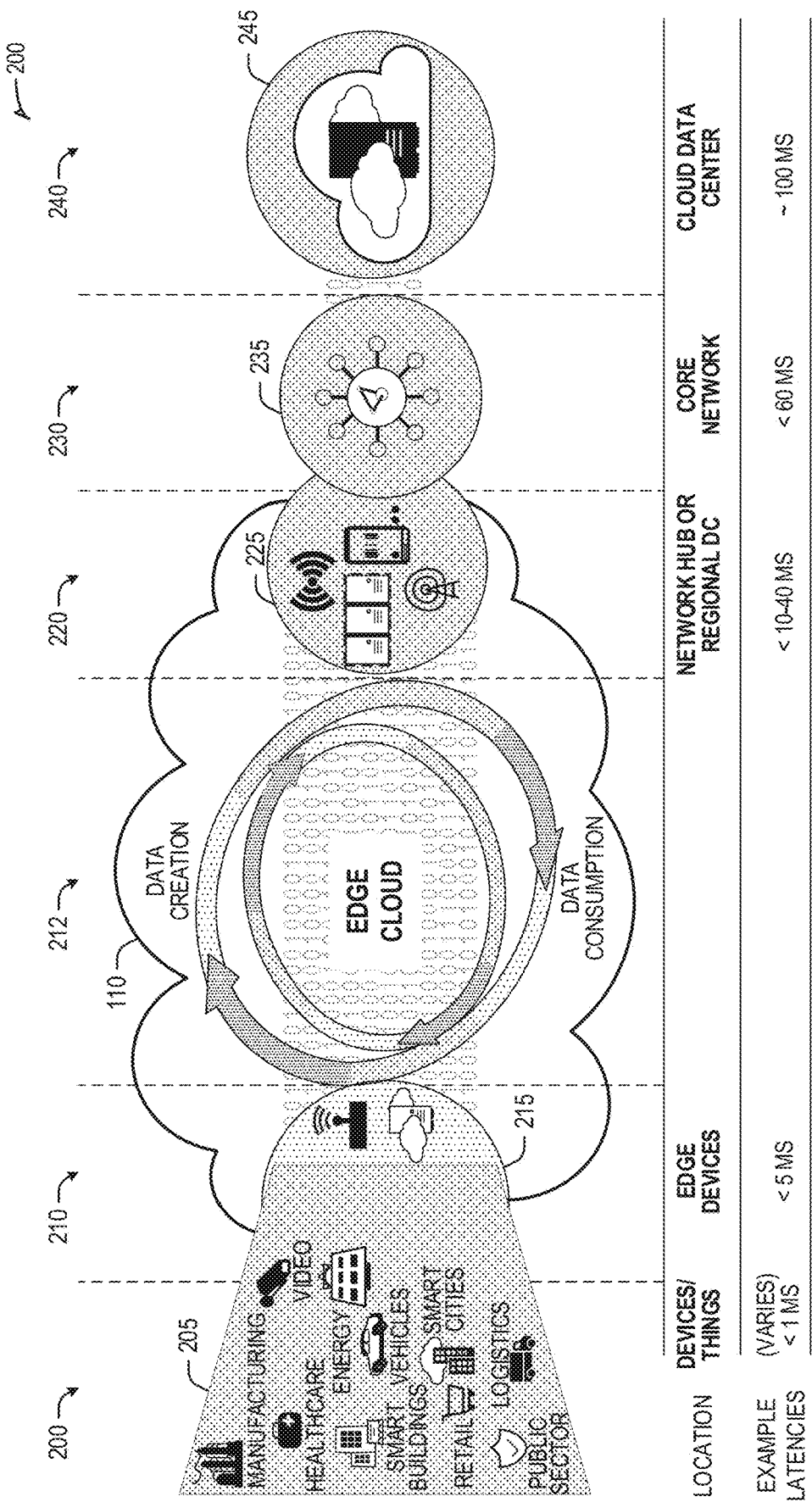
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers, or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210 to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer. As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.) which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
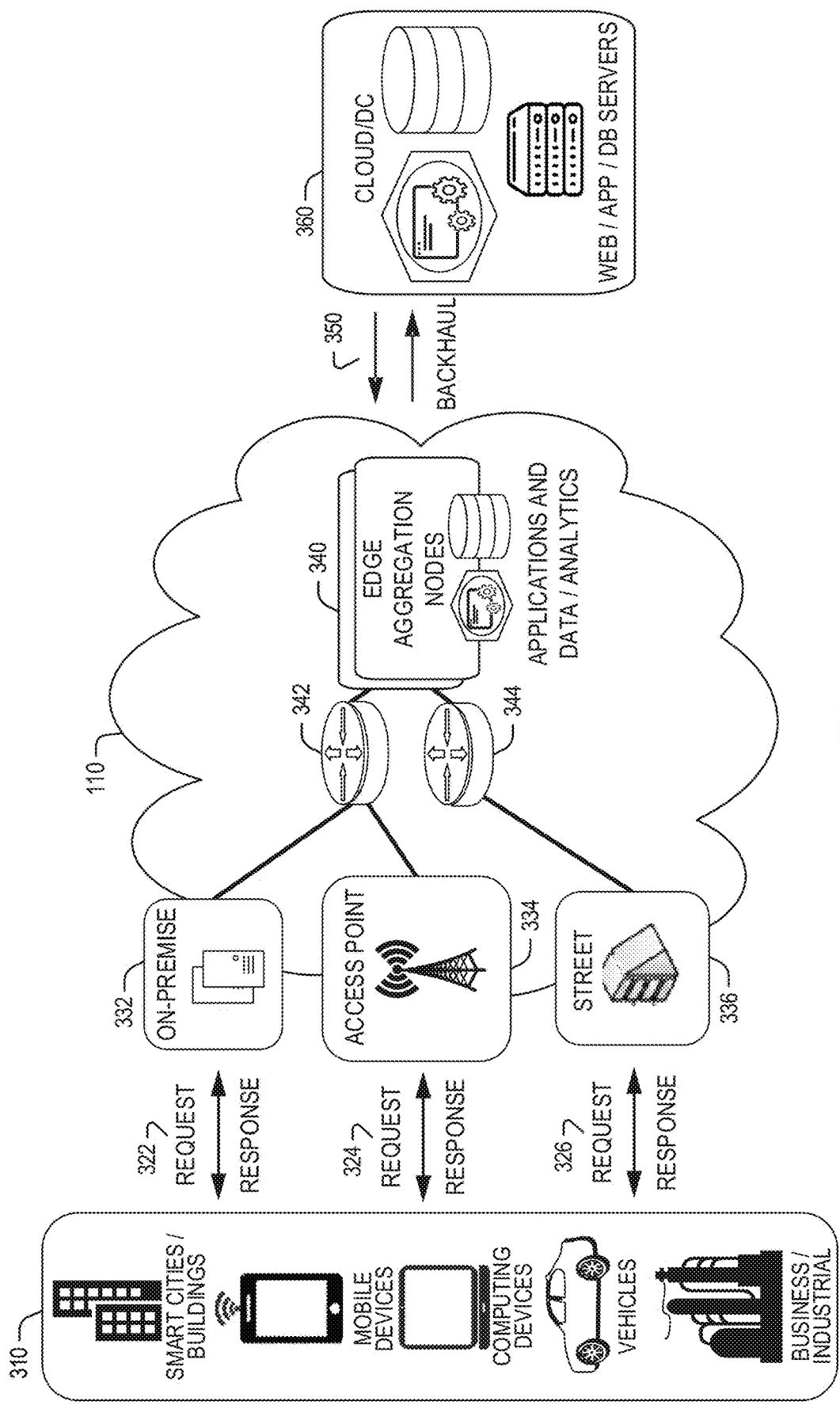
FIG. 3 illustrates a block diagram of an example environment for networking and services in an edge computing system.

FIG. 3 illustrates a block diagram of an example environment 300 in which various client endpoints 310 (in the form of mobile devices, computers, autonomous vehicles, business computing equipment, industrial processing equipment) exchange requests and responses with the example edge cloud 110. For instance, computers, business computing equipment, and industrial processing equipment may obtain network access via a wired broadband network, by exchanging requests and responses 322 through an on-premise network system 332. Mobile computing devices may obtain network access via a wireless broadband network, by exchanging requests and responses 324 through a cellular network tower 334. Autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests.

Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. (Additional or consolidated instances of the edge aggregation nodes 340 and the aggregation points 342, 344, including those deployed on a single server framework, may also be present within the edge cloud 110 or other areas of the TSP infrastructure).

Figure 4:
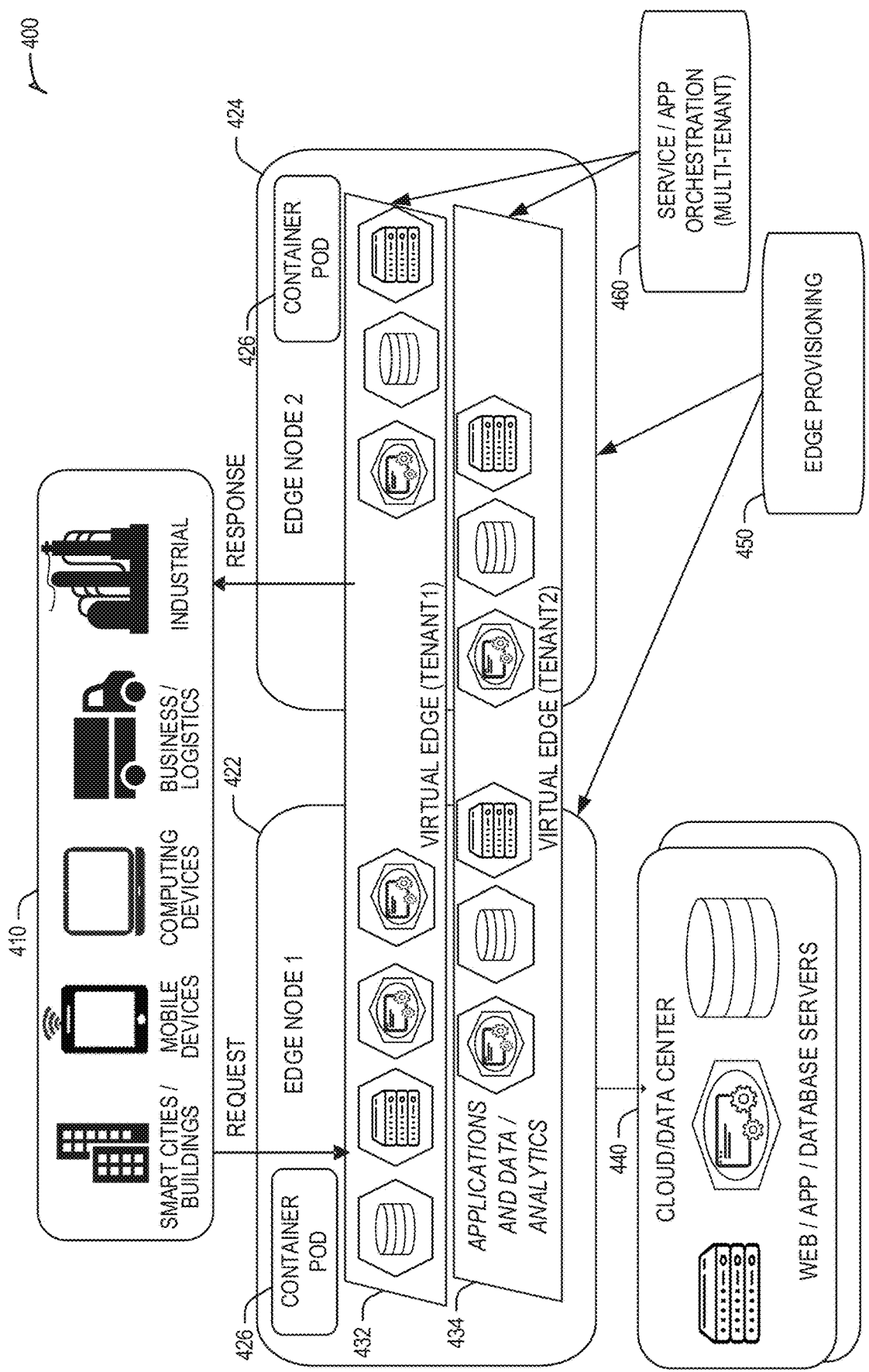
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.) which access various virtual edge instances. Here, the virtual edge instances provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices 410 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 410, 422, and 440 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each of the edge nodes 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., the orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
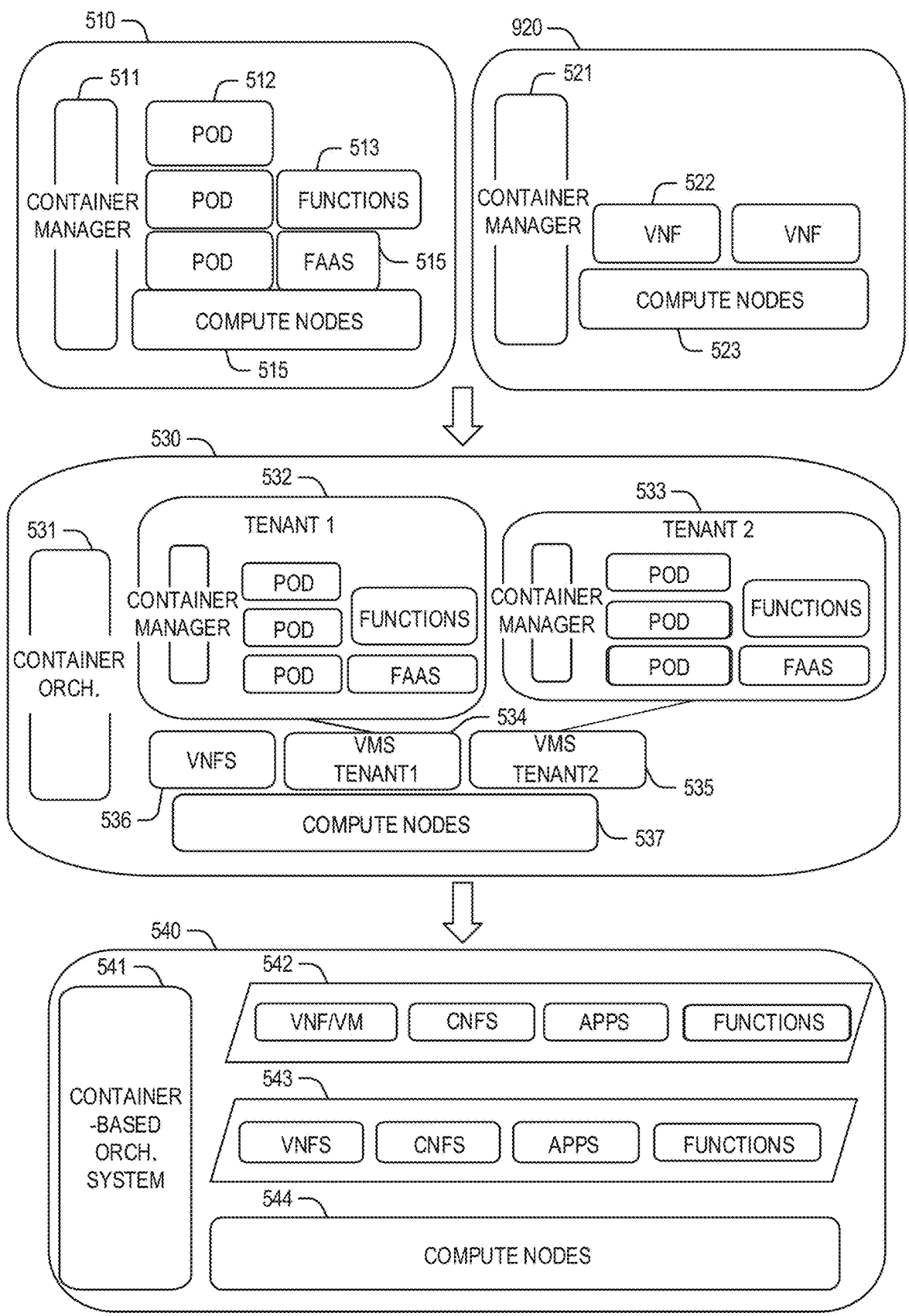
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and a container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in an example system arrangement 530 (using compute nodes 537), where containerized pods (e.g., pods 512), functions (e.g., functions 513, VNFs 522, 536), and functions-as-a-service instances (e.g., FaaS instance 515) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by a container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
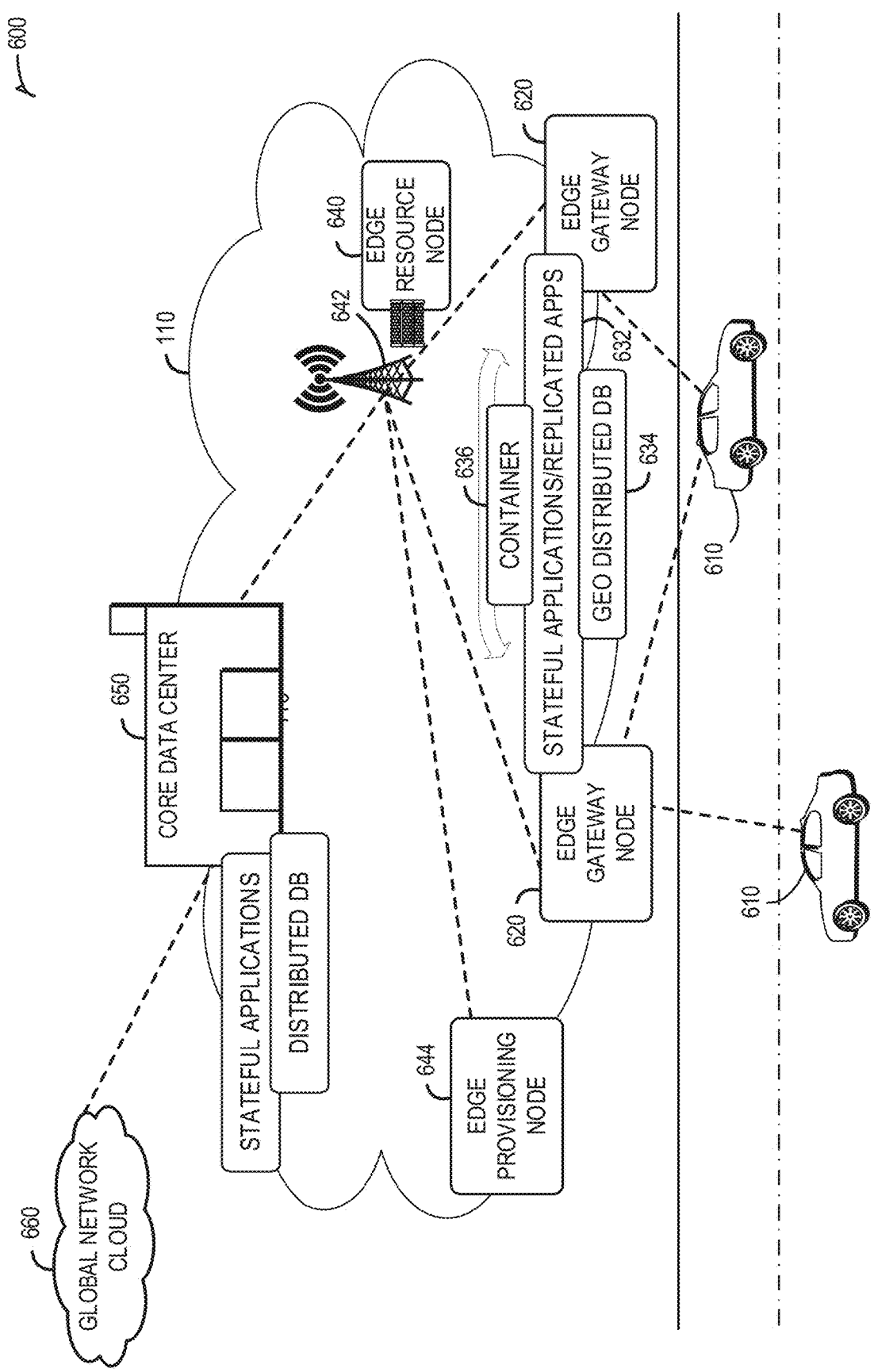
FIG. 6 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 6 shows an example simplified vehicle compute and communication use case involving mobile access to applications in an example edge computing system 600 that implements an edge cloud such as the edge cloud 110 of FIG. 1. In this use case, respective client compute nodes 610 may be embodied as in-vehicle compute systems (e.g., in-vehicle navigation and/or infotainment systems) located in corresponding vehicles which communicate with example edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular one of the edge gateway nodes 620 may propagate so as to maintain a consistent connection and context for the example client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances or components located at or in a communication base station 642 (e.g., a based station of a cellular network). As discussed above, the respective edge resource node(s) 640 include an amount of processing and storage capabilities and, as such, some processing and/or storage of data for the client compute nodes 610 may be performed on the edge resource node(s) 640. For example, the processing of data that is less urgent or important may be performed by the edge resource node(s) 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The example core data center 650 provides a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource node(s) 640 may offer the use of stateful applications 632 and a geographic distributed database 634. Although the applications 632 and database 634 are illustrated as being horizontally distributed at a layer of the edge cloud, it will be understood that resources, services, or other components of the application may be vertically distributed throughout the edge cloud (including, part of the application executed at the client compute node 610, other parts at the edge gateway nodes 620 or the edge resource node(s) 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from one of the edge nodes 620 to other edge nodes (e.g., another one of the edge nodes 620, one of the edge resource node(s) 640, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 640 may differ from the hardware at the edge gateway nodes 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node(s) 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similar to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
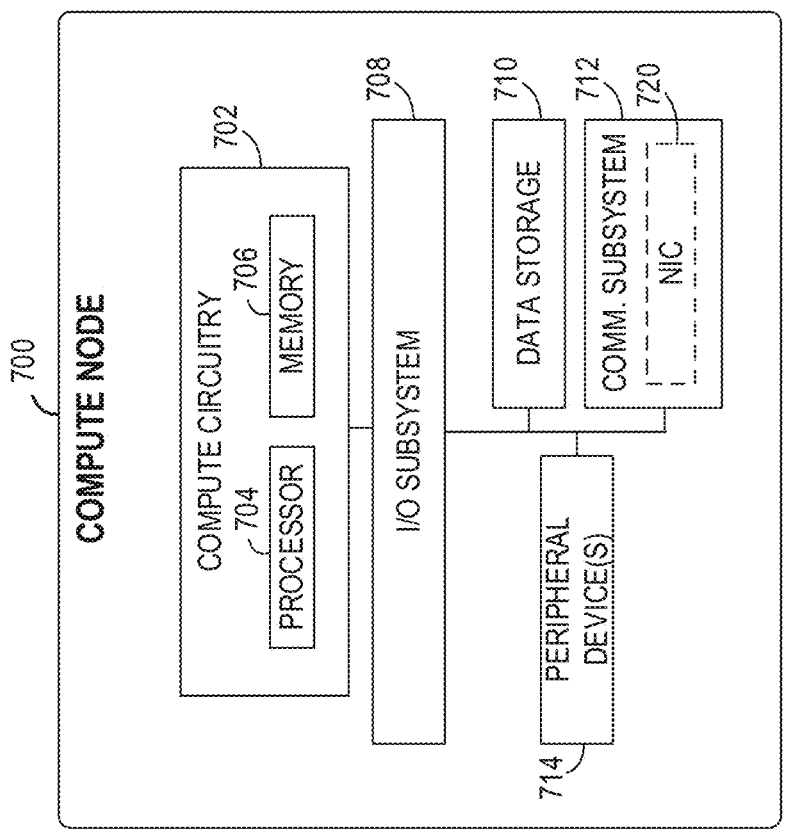
FIG. 7A is a block diagram of an example implementation of an example compute node that may be deployed in one of the edge computing systems illustrated in FIGS. 1-4 and/or 6.

FIG. 7A is a block diagram of an example implementation of an example edge compute node 700 that includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 700 of FIG. 7 may be deployed in one of the edge computing systems illustrated in FIGS. 1-4 and/or 6 to implement any edge compute node of FIGS. 1-4 and/or 6.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The main memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 706 may be integrated into the processor 704. The main memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the main memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
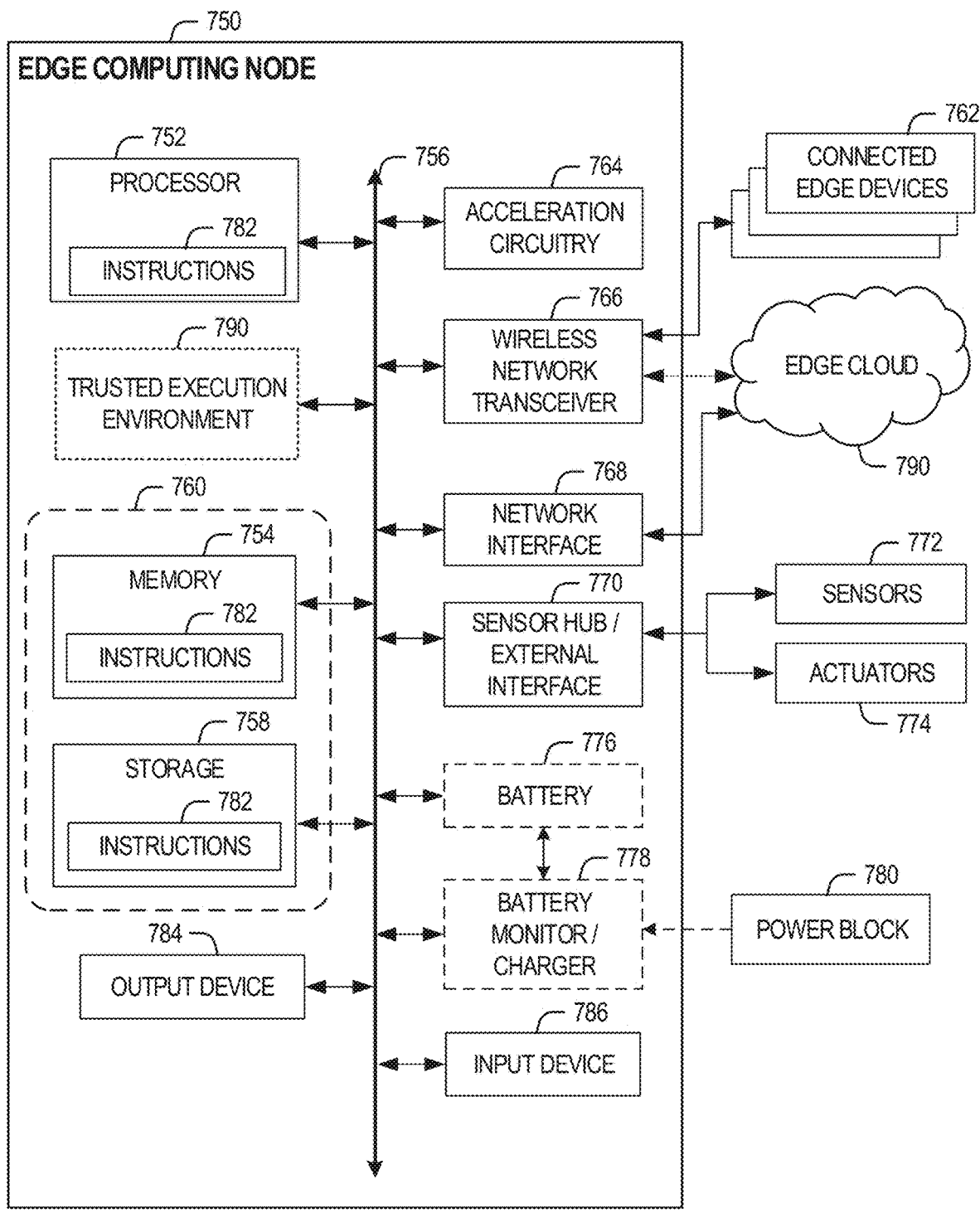
FIG. 7B is another block diagram of an example implementation of an example compute node that may be deployed in one of the edge computing systems illustrated in FIGS. 1-4 and/or 6.
Figure 9:
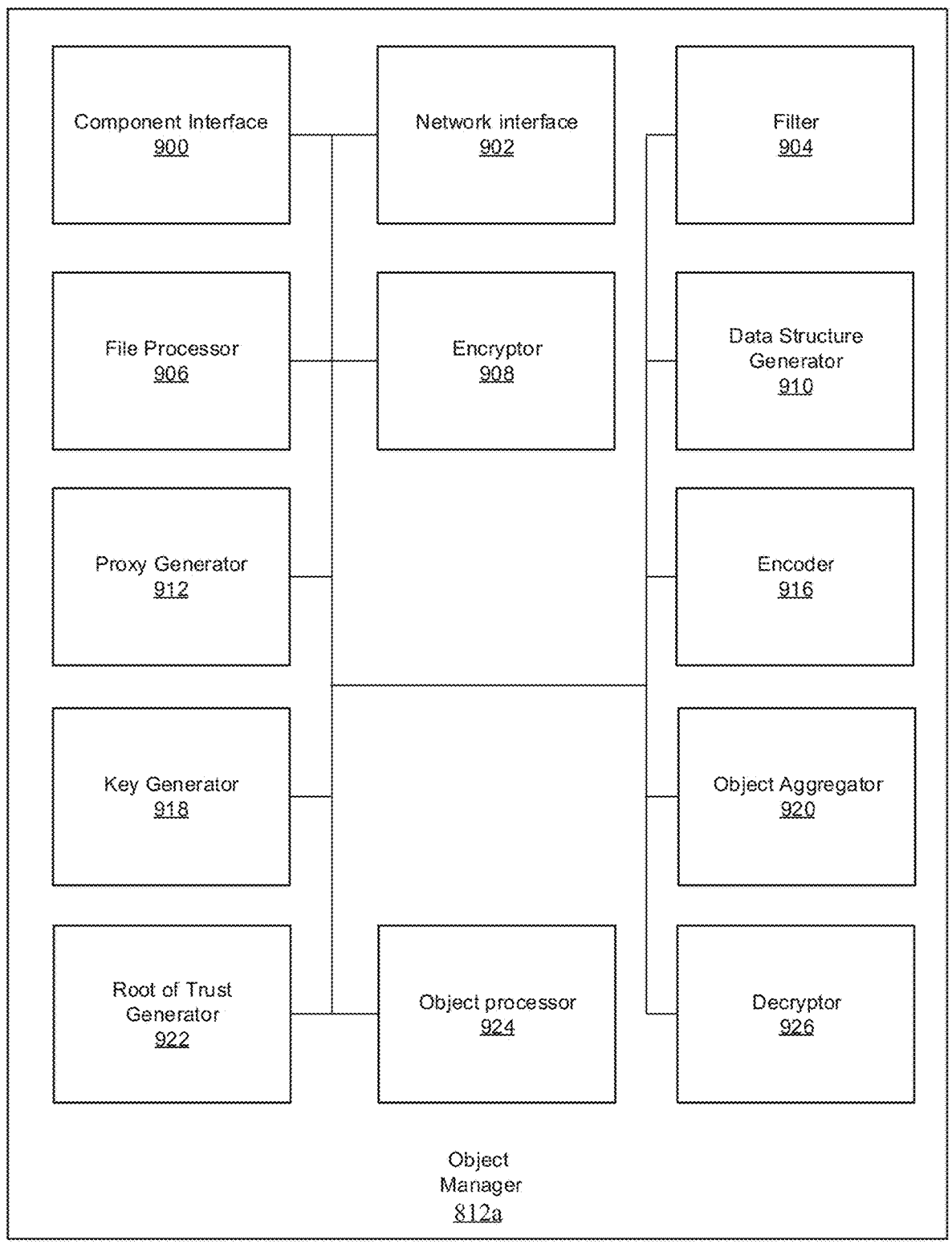
FIG. 9 is a block diagram of an example implementation of an object manager included in the system architecture of FIG. 8.
Figure 15:
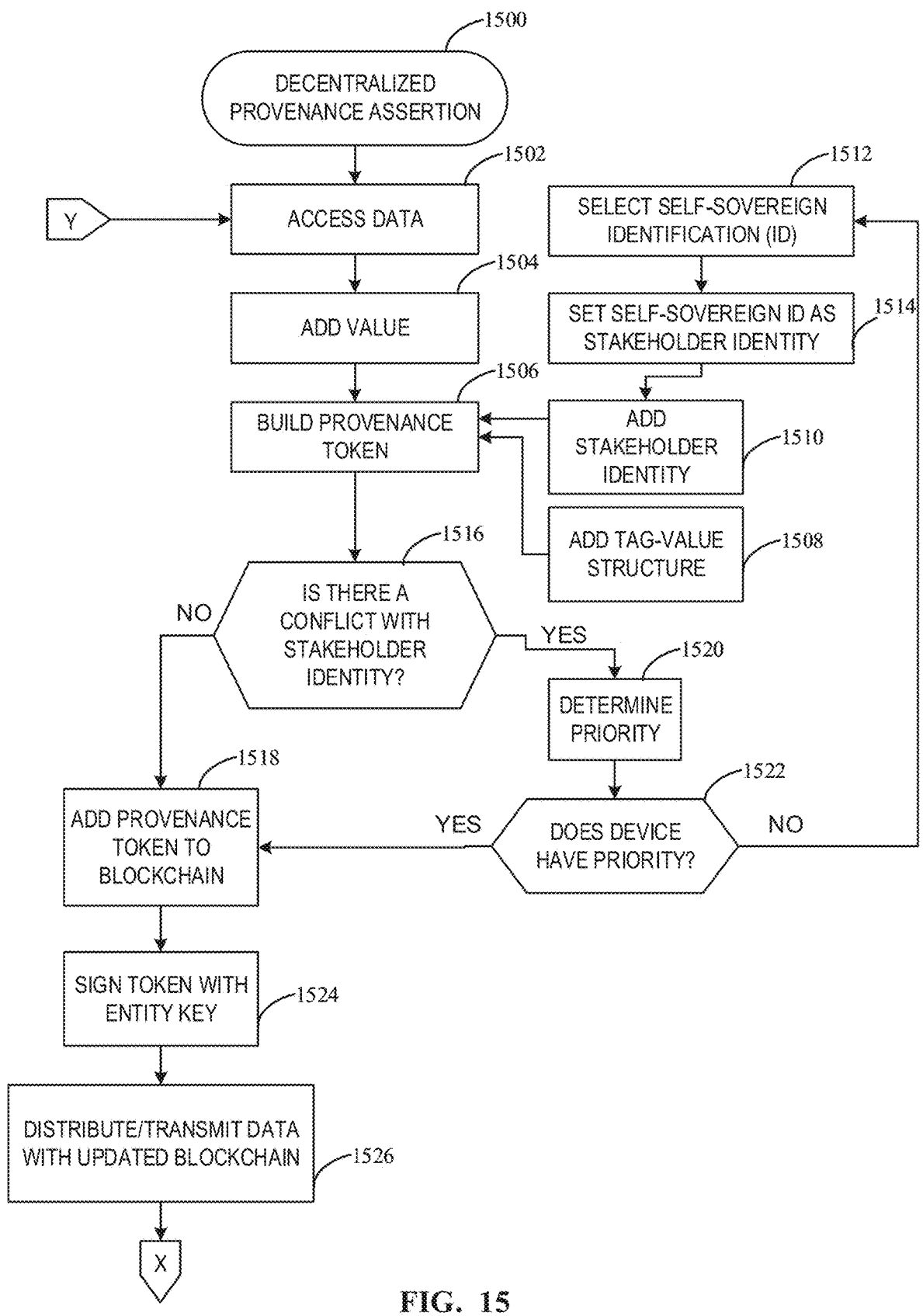
FIG. 15 is a flowchart representative of example machine readable instructions which may be executed to implement the example object manager of FIGS. 8 and 9 to assert provenance.
Figure 16:
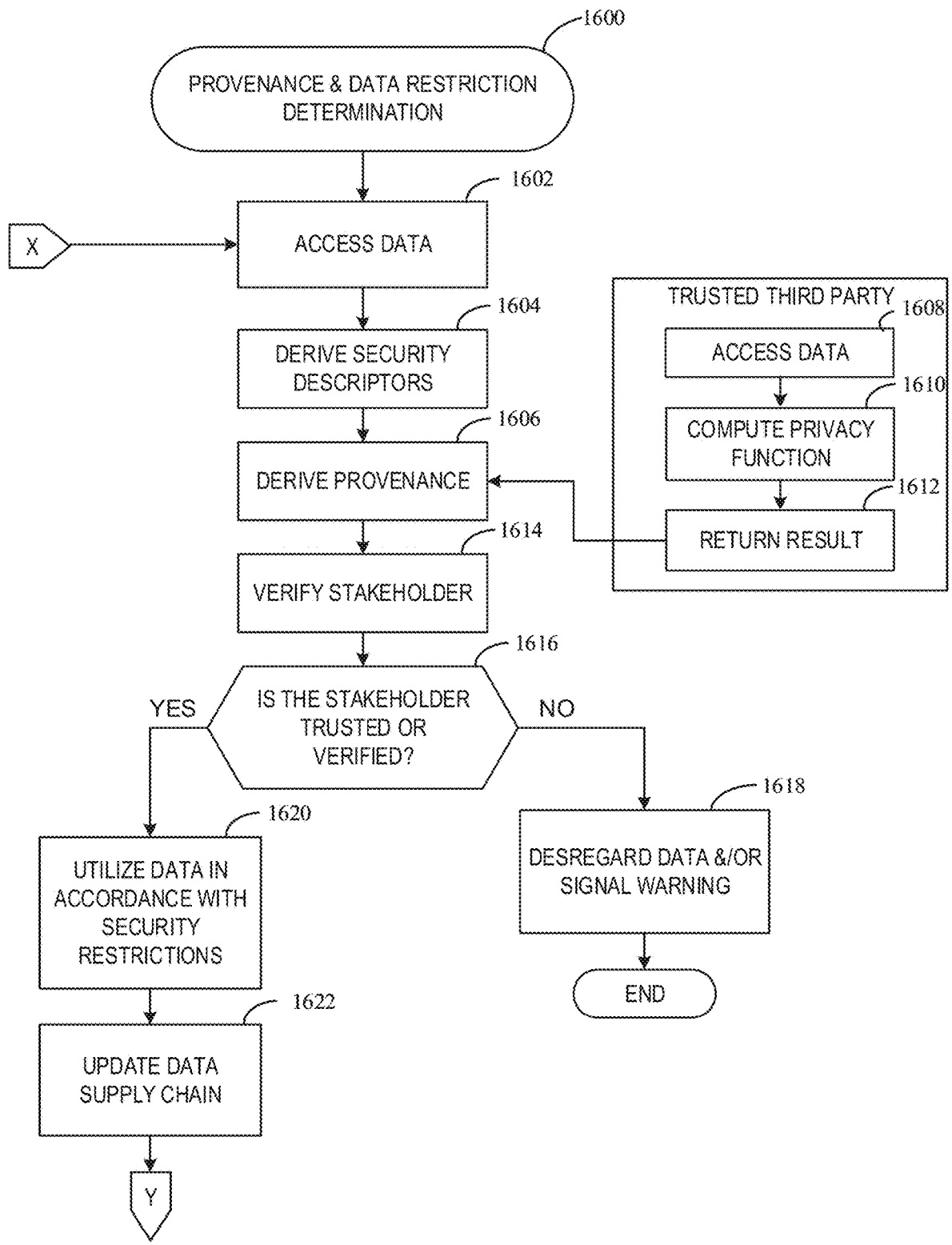
FIG. 16 is a flowchart representative of example machine readable instructions which may be executed to implement the example object manager of FIGS. 8 and 9 to determine provenance and data restrictions.

In a more detailed example, FIG. 7B illustrates a block diagram of an example that may edge computing node 750 structured to execute the instructions of FIGS. 15 and 16 to implement the techniques (e.g., operations, processes, methods, and methodologies) described herein such as the apparatus of FIG. 9. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system. For example, the edge computing node 750 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B. In this example, the processor 752 implements the object manager 812a and its components as shown in FIG. 9.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others. 8922

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an I2C interface, an SPI interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on BLE, or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 790 via local or wide area network protocols. The wireless network transceiver 766 may be an LPWA transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 790 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more AI accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 1500, 1600 of FIGS. 15 and 16 may be stored in the mass storage device 1028, in the volatile memory 1014, in the non-volatile memory 1016, and/or on a removable non-transitory computer readable storage medium such as a CD or DVD.

Edge computing use cases in mobile network settings have been developed for integration with Multi-access Edge Computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (e.g., devices, hosts, tenants, service providers, operators, etc.) are involved.

In a similar manner, IoT networks and devices are designed to offer a distributed compute arrangement from a variety of endpoints. IoT devices can be physical or virtualized objects that may communicate on a network, and can include sensors, actuators, and other input/output components, which may be used to collect data or perform actions in a real-world environment. For example, IoT devices can include low-powered endpoint devices that are embedded or attached to everyday things, such as buildings, vehicles, packages, etc., to provide an additional level of artificial sensory perception of those things. IoT devices have become more popular and thus applications using these devices have proliferated.

In some examples, an edge environment can include an enterprise edge in which communication with and/or communication within the enterprise edge can be facilitated via wireless and/or wired connectivity. The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices including establishing provenance to determine data integrity and/or data restrictions.

The present techniques and configurations may be utilized in connection with many aspects of current networking systems, but are provided with reference to Edge Cloud, IoT, MEC, and other distributed computing deployments. The following systems and techniques may be implemented in, or augment, a variety of distributed, virtualized, or managed edge computing systems. These include environments in which network services are implemented or managed using MEC, fourth generation (4G) or fifth generation (5G) wireless network configurations; or in wired network configurations involving fiber, copper, and/or other connections. Further, aspects of processing by the respective computing components may involve computational elements which are in geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

As disclosed herein, edge environments include networks and/or portions of networks that are located between a cloud environment and an endpoint environment. Edge environments enable computations of workloads at edges of a network. For example, an endpoint device may request a nearby base station to compute a workload rather than a central server in a cloud environment. Edge environments include edge services, which include pools of memory, storage resources, and processing resources. Edge services perform computations, such as an execution of a workload, on behalf of other edge services and/or edge nodes. Edge environments facilitate connections between producers (e.g., workload executors, edge services) and consumers (e.g., other edge services, endpoint devices).

Because edge services may be closer in proximity to endpoint devices than centralized servers in cloud environments, edge services enable computations of workloads with a lower latency (e.g., response time) than cloud environments. Edge services may also enable a localized execution of a workload based on geographic locations or network topographies. For example, an endpoint device may require a workload to be executed in a first geographic area, but a centralized server may be located in a second geographic area. The endpoint device can request a workload execution by an edge service located in the first geographic area to comply with corporate or regulatory restrictions.

Examples of workloads to be executed in an edge environment include autonomous driving computations, video surveillance monitoring, machine learning model executions, and real time data analytics. Additional examples of workloads include delivering and/or encoding media streams, measuring advertisement impression rates, object detection in media streams, speech analytics, asset and/or inventory management, and augmented reality processing.

Edge services enable both the execution of workloads and a return of a result of an executed workload to endpoint devices with a response time lower than the response time of a server in a cloud environment. For example, if an edge service is located closer to an endpoint device on a network than a cloud server, the edge service may respond to workload execution requests from the endpoint device faster than the cloud server. An endpoint device may request an execution of a time-constrained workload from an edge service rather than a cloud server.

In addition, edge services enable the distribution and decentralization of workload executions. For example, an endpoint device may request a first workload execution and a second workload execution. In some examples, a cloud server may respond to both workload execution requests. With an edge environment, however, a first edge service may execute the first workload execution request, and a second edge service may execute the second workload execution request.

To execute the workloads, the edge services and/or edge devices access and process data. It is important that the edge services and/or edge devices know the origin or source of the data and whether the data can be trusted. Examples disclosed herein establish accurate and secure data collection processes by supplying data provenance throughout the workflow of an edge service from device to device as data and value-added creation to that data is accessed, used, developed, and transmitted among devices, servers, and/or networks. Details of the data, including the provenance and history, are recorded in data supply chains including, for example, in a growing list of records such as a blockchain.

Data supply chains correspond to the lifecycle of data. An example data supply chain for media data (also referred to as media) is as follows. When media is created, the initially created media may be adjusted by an author, editor, etc. various times until final media is created. For example, a musician may create an audio file and a sound engineer may adjust the audio file (e.g., by mixing, mastering, and/or otherwise adjusting one or more volumes, audio spectrums, pitches, etc.) to create a final audio file that may be released as a song. Further, once the song is released, disc jockeys may further adjust the audio song to create new songs, mix with other music, etc. At each stage, the audio is adjusted and/or manipulated.

Data lifecycles in edge computing environments address several challenges including non-linear evolution of authors/artists of media; distributed evolution; integration with tools that bridge user interface and enhance creativity, productivity, and quality; efficient handing of large sets of data, projects, and/or archives; integrity of intermediate and final works; authenticity of intermediate and final works (e.g., works can be associated with its rightful artist); licensing, copyright, use, and other legally binding considerations that may be applied to data, digital creations, digital representations of analog creations, etc.; strategies for combining, merging, modifying data, creations, and/or works when multiple changes apply to the same data, creation or work; and/or keeping historically accurate record of changes to data or inferences created from data regardless of ecosystem, participant, and/or stakeholder changes. Examples disclosed herein integrate change control management techniques into edge compute services and edge data pools, edge information-centric networks (ICN) and edge data serialization for video, multi-media, structured data, metadata, software update files, user productivity files, etc.

Examples disclosed herein link data (e.g., media, audio, video, text, etc.) with a data supply chain (DSC) object. In some examples disclosed herein, the DSC object is a data structure that traces evolution, ownership, disclosure, and/or use of the data that the object is linked to. An example DSC object disclosed herein enables integration of such tracing into an open ledger like Blockchain and/or any other distributed mechanism. In some disclosed examples, the DSC object facilitates declarative management of transmissions over data and metadata. Examples disclosed herein include creating a DSC object that creates and updates change management metadata corresponding to the DSC data object. Examples disclosed herein further include using a blockchain to trace and/or record data provenance (e.g., inputs, entities, systems, processes, etc., that influence the data linked to the DSC object) to enforce and/or audit data protection through a data supply chain. A blockchain is a list of record (e.g., blocks) that are linked using cryptography, where each block may include a cryptographic hash of the previous block, a timestamp, and transaction data (e.g., a Merkle tree). A Merkle tree is a tree that may include leaf nodes that are labeled with a hash of a data block and non-leaf nodes labelled with the cryptographic hashes of the labels of their child nodes.

Examples disclosed herein further include building tools into a DSC data object for managing changes and/or exploring the provenance of inferencing results taken from edge data streams. In this manner, as the media is passed from device to device, each device and/or a separate object monitoring service device can manipulate the media using the tools and/or can obtain the building tools to analyze the history of the data. Examples disclosed herein further include applying data serialization formats that support cryptographic operations to provide security to the DSC objects. Examples disclosed herein further allow for performance of data mashups (e.g., data merges) that result in new compositions that can be tracked through a data supply chain.

Data supply chains anticipate dynamic value-added creation and/or augmentation of data pools. For example, mashups involving multiple data pools (e.g., a first and second data pools) may result in a third pool that is jointly owned and/or controlled by a first and a second content provider. A mashup is a combination of two or more data sources in some manner. Additionally, the mashup algorithm may be owned and/or controlled by a fourth entity. A mashup algorithm is the manner in which the data sources of a mashup are combined. The data sources, the data owners, the content providers or creators, the algorithm developers, and/or other entities with a financial, privacy, and/or other interest in the data and/or value added to the data are stakeholders. The stakeholders in a data supply chain interaction want their stake to be represented and securely preserved through provenance preserving instrumentation. Provenance data includes at least the stakeholder's identity and a claim to the value provided and/or ownership and/or privacy rights. A claim may include a tag-value structure where the tag identifies the type of content or transformation supplied. The value includes specific reference to the content or algorithm incorporated. In some examples disclosed herein, provenance tokens are digitally signed by the entity's key where the entity's key is registered with a trusted community management organization or association. In some examples, the key is registered with a distributed ledger system (DLS) that is public or semi-permissioned such that a consensus of reviewers may be able to resolve disputes over content mashup events.

Examples disclosed herein also allow for self-sovereign digital identity selection to enable stakeholders to leverage the blockchain to create their own identities in a decentralized manner without oversight or permission requests from a central registry. The stakeholders can select self-sovereign identification for decentralized provenance assertion and add that identification and a tag-value structure to a data supply chain. Thus, the stakeholders can add context, for example in the form of metadata, to data to give provenance to the data in a decentralized manner.

Figure 8:
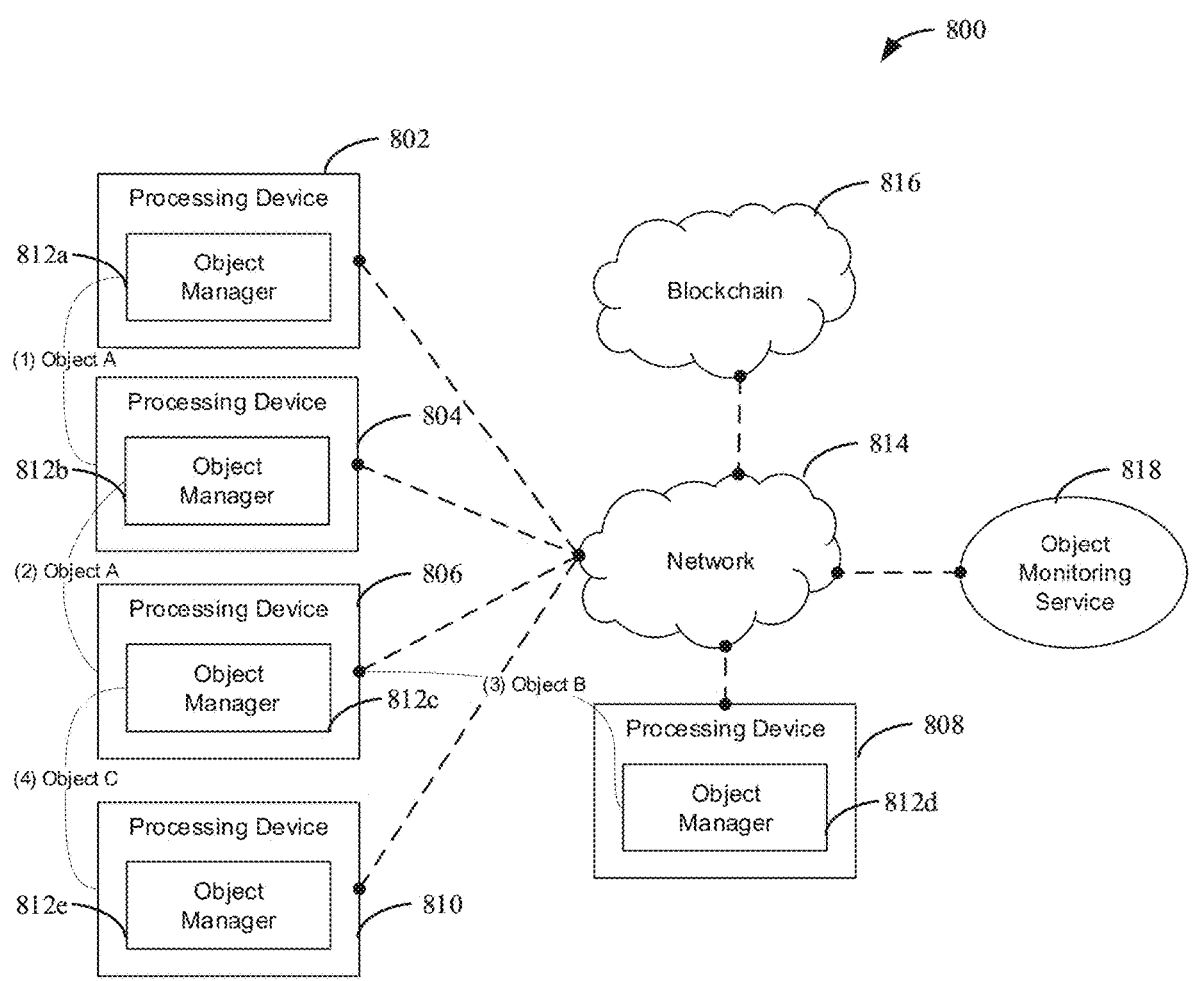
FIG. 8 illustrates an example system architecture including a group of data supply chain devices participating in a data supply chain in accordance with teachings of this disclosure.

FIG. 8 illustrates an example system architecture 800 including a group of DSC devices participating in a data supply chain. The example system architecture 800 includes example end point or processing devices 802, 804, 806, 808, 810, an example object managers 812a-e, an example network 814, example blockchain services 816, and an example object monitoring service 818. Although the example system architecture 800 includes five processing devices, the system architecture 800 could include any number of processing devices.

The example processing devices 802, 804, 805, 808, 810 of FIG. 8 are computing devices that generate, receive, and/or modify data (e.g., a media file). The example processing devices 802, 804, 806, 808, 810 may be end user devices, smart devices, edge devices, servers, and/or any other type of computing device. In the example of FIG. 8, the example processing devices 802 and 808 act as DSC object creation devices, the example processing devices 804 and 810 act as DSC object consumption devices, and the example processing device 806 acts as a DSC object aggregating device, as further described below. However, any of the example processing devices 802, 804, 806, 808, 810 can operate as creation devices, consumption devices, and/or aggregator devices. For example, the example processing device 802 may act as a creation device at a first time and act as a consumption and/or aggregator device at a second time. A creation device is a device that creates data linked to DSC object, a consumption device is a device that receives, modifies, and/or views or otherwise interacts with and/or consumes data linked to a DSC object, and an aggregator device is a device that aggregates two or more DSC objects into a single DSC object that includes data from the two or more DSC objects. The example processing devices 802, 804, 806, 808, 810 may transmit the data and/or corresponding DSC object to other devices in the system 800 via the example network 814. Thus, the processing devices 802, 804, 806, 808, 810 can play multiple roles and can cascade data throughout the system 800. The example processing devices 802, 804, 806, 808, 810 include the example object managers 812*a-e*.

The example object managers 812*a-e* of FIG. 8 are hardware and/or software (e.g., an application, a driver, etc.) implemented by the example processing devices 802-810, respectfully. The example object managers 812*a-e* generate a DSC object for generated data and/or modifies the DSC object when the data is accessed, modified, viewed, deleted, etc. For example, when the processing device 802 generates new data (e.g., an edge device creating new data and/or a user creating media at the processing device 802), the object managers 812*a-e* generate a DSC object to be linked to the new data. In this manner, when a requesting device (e.g., another processing device 804-810) requests the data, the object manager 812*a* of the transmitting device transmits (e.g., via a wired or wireless connection) the data with the corresponding DSC object. When the requesting device accesses, edits, etc. the received data, the requesting device updates the corresponding DSC object to reflect the access, edits, etc. In the illustrated example, the DSC object created by one or more of the managers 812*a-e* includes a local Merkle Tree, local data objects (e.g., working files corresponding to the data), object metadata, a revisions log, and a local commit log, as further described below in conjunction with FIG. 3A. The DSC object acts as a record of the use and/or modification of the data throughout its life cycle. In the illustrated example, when the processing device 804 obtains data linked to a DSC object (e.g., to view the data and/or to modify the data), the object managers 812*a-e* modify the linked DSC object corresponding to the actions taken (e.g., viewing, modifying, etc.) on the data. For example, the object generator managers 812*a-e* may modify the DSC object to track views of the corresponding data for digital rights management purposes (e.g., tracking and/or paying for data consumed and recorded). In some examples, the object managers 812*a-e* may aggregate one or more DSC objects into a new DSC object that combines information of the one or more DSC objects. For example, the processing device 806 may receive a first DSC object (corresponding to Object A in FIG. 8) associated with first data from the example processing device 804 (e.g., via network 814) and receive a second DSC object (corresponding to Object B in FIG. 8) associated with second data from the example processing device 808 (e.g., via network 814). In such an example, the object manager 812*c* of the example processing device 806 may aggregate (e.g., combine) information from Object A and/or some or all of the first data and/or Object B and/or some or all of the second data to generate a third DSC object (corresponding to Object C in FIG. 8). In this manner, Object A is linked to the first data, Object B is linked to the second data, and Object C is linked (e.g., corresponding to a generational dependency) to third data corresponding to a combination/aggregation of the first and second data. For example, the delta between Object A and Object C links the two objects. In some examples, Object A may disappear once Object B is instantiated. However, a log, history, metadata, etc. remains that vouches for the existence of Object A. In some examples, a first version of a data in a DSC (Object C1) can be shared and/or cloned with multiple other DSC objects that makes changes to C1 (e.g. C1', C1", C1''', etc.). In such examples, the changes are merged back to C1 to produce C2 that corresponds to a sum or aggregate of the changes. In some examples, one or more of the object managers 812*a-e* create a trusted layer component (e.g., root of trust) to instantiate a modular portable data pool. In this manner, a DSC object can be secured. For example, the DSC object can be put under portable data pool control, the DSC object can be encrypted and/or attested to a peer node using an attestation protocol. The example object manager 812*a* is further described below in conjunction with FIG. 9.

The example network 814 of FIG. 8 is a system of interconnected systems exchanging data. The example network 814 may be implemented using any type of public or private network such as, but not limited to, the Internet, a telephone network, a local area network (LAN), a cable network, a cloud-based network, an edge network, a wired network, a wireless network, and/or any other network disclosed herein. To enable communication via the network 814, the example processing devices 802, 804, 806, 808, 810 may include a communication interface that enables a connection to an Ethernet, a digital subscriber line (DSL), a telephone line, a coaxial cable, a wired connection, a wireless connection, etc., or any combination thereof.

The example blockchain 816 of FIG. 8 is a decentralized object change management network that enforces data provenance for data linked to DSC objects as the data is consumed and/or modified. The example blockchain 816 of FIG. 8 uses smart contracts (e.g., a protocol to digitally facilitate, verify, and/or enforce a contract corresponding to data linked to DSC objects). However, other protocols may be used to enforce contracts and/or otherwise manage the lifespan of data linked with DSC objects. The example blockchain 816 records revisions to data linked to a DSC objects in a local log as the starting point of a next evolution of the data and/or corresponding DSC object that may subsequently be applied. For example, if the processing device 802 generates data linked to a new DSC object and the processing device 802 establishes a connection to the example network 814, the example blockchain miners of the blockchain 816 can recognize the presence of the DSC Object and, using a distributed consensus algorithm, agree regarding the DSC Objects name, local data objects, object metadata, revisions and a commit file. The DSC object may be associated with cryptographic key(s) that protect integrity, confidentiality and the DSC object identifying in the system 800. In some examples, if the data linked to an DSC object corresponds to digital rights management, the example blockchain 816 records viewing and/or modification of the data and/or payment for data consumption. In some examples, the blockchain 816 issues certificates to the example processing devices 802, 804, 806, 808, 810 to generate proxy identities.

The example object monitoring service 818 of FIG. 8 is a centralized object change management device (e.g., one or more servers, processors, etc.) that tracks, monitors, and/or enforces data provenance and integrity for data and/or the underlying infrastructure linked to DSC objects as the data is consumed and/or modified in a similar manner as the blockchain 816. The example object monitoring service 818 records revisions to data linked to a DSC objects in a local log as the starting point of a next evolution of the data and/or corresponding DSC object that may subsequently be applied. For example, if the processing device 802 generates data linked to a new DSC object and the processing device 802 establishes a connection to the example network 814, the object monitoring service 818 can recognize the presence of the DSC Object and, using a distributed consensus algorithm, agree regarding the DSC Objects name, local data objects, object metadata, revisions and a commit file. The DSC object may be associated with cryptographic key(s) that protect integrity, confidentiality and the DSC object identifying in the system 800. In some examples, if the data linked to an DSC object corresponds to digital rights management, the object monitoring service 818 can record viewing and/or modification of the data and/or payment for data consumption. In some examples, the object monitoring service 818 issues certificates to the example processing devices 802, 804, 806, 808, 810 to generate proxy identities. Additionally, the example object monitoring service 818 can monitor updates to the blockchain 816. For example, the object monitoring service 818 may identify fair use, licensed, and/or unlicensed use of media resulting in some appropriate compensating transactions (e.g., reporting fair use, collecting royalties for licensed use, and/or notifying law enforcement for unlicensed use). Additionally or alternatively, the object monitoring server 818 may employ an enterprise risk management (ERM) workflow to control sensitive content access using an access control service (e.g., Open Authorization (OAuth2), Security Assertion Markup Language (SAML), eXtensible Access Control Markup Language (XACML), Radius, etc.). Although the example system architecture 800 includes an example blockchain 816 and an example object monitoring service 818 to track data and corresponding DSC object, the example system architecture 800 may only include one of the blockchain 816 or the object monitoring service 818 to track data and corresponding DSC objects. Further, as disclosed herein, the stakeholders (the processing devices 802, 804, 806, 808, 810) can assert their identities in a decentralized manner without employing the object monitoring service 818.

FIG. 9 is block diagram of an example implementation of the object manager 812a of FIG. 8. The example object manager 812a of FIG. 9 may be used to implement one or more of the object managers 812a-e of FIG. 8. The example object manager 812a of FIG. 9 includes an example component interface 900, an example network interface 902, an example filter 904, an example file processor 906, an example encryptor 908, an example data structure generator 910, an example proxy generator 912, an example encoder 916, an example key generator 918, an example object aggregator 920, an example root of trust generator 922, an example object processor 924, and an example decryptor 926.

The example component interface 900 of FIG. 9 interfaces with components of the example processing device 802, 804, 806, 808, 810 to obtain data stored in, received by, and/or used by the example processing device 802, 804, 806, 808, 810. For example, the component interface 900 may access and/or modify files (e.g., media and/or data that has been generated, received, viewed, etc.), data corresponding to the files, metadata, certificates, roots of trust, etc. In some examples, the component interface 900 interfaces with components of other ones of the processing devices 802, 804, 806, 808, 810 to obtain data stored in, received by, and/or used by the other processing devices 802, 804, 806, 808, 810.

The example network interface 902 of FIG. 9 access the example network 814 to transmit (e.g., via a wired or wireless connection) DSC data objects to any one of the example processing devices 802, 804, 806, 808, 810, the example blockchain 816, and/or the example object monitoring service 818. Additionally, the example network interface 902 may receive/transmit (e.g., via a wired or wireless connection) digest values, attestation requests, signed data, vouchers, certificates, metadata, and/or other data from/to any one of the example processing devices 802, 804, 806, 808, 810, the example blockchain 816, and/or the example object monitoring service 818. In some examples, the network interface 902 broadcasts the DSC object for other processing devices 802, 804, 806, 808, 810 and/or the object monitoring service 818 to agree on the semantics of the metadata including the stakeholder identity and the value-tag structure.

The example filter 904 of FIG. 9 filters obtained data (e.g., media, data files, etc.). For example, if the object manager 812a is implemented in an IoT device, the obtained data may be a high volume of machine generated data and/or data corresponding to machine operation (e.g., performance, reliability, power, noise telemetry, etc.). Accordingly, the example filter 904 may filter the high volume of obtained data into a fraction of the data that will be retained for long term use. In such an example, the remaining fraction may be stored for a short duration for any problem exploration or qualification before being discarded. The example filter 904 may filter the obtained data based on user and/or manufacturer preference regarding how to filter and/or how much to filter.

The example file processor 906 of FIG. 9 processes received data files to identify information corresponding to the file for purposes of DSC object creation. For example, the file processor 906 may determine whether the data file includes sensitive data (e.g., if the data was flagged as sensitive), whether the DSC object is controlled using self-sovereign identity (SSI), whether a file corresponds to a particular format or structure, the type of encryption to use, whether the data should be limited to particular device(s) based on user and/or manufacturer preferences, etc.

SSI is an identity management system where the user manages the elements that make up the identity and controls access to the credentials digitally. An object may be controlled using self-sovereign identity based on user and/or manufacturer preferences. Self-sovereign approaches such as, for example, W3C Decentralized ID (DID) allow stakeholders such as, for example, the processing devices 802, 804, 806, 808, 810 to assert and prove identity to other stakeholders and to establish trust in storage resources and/or data pools. Self-sovereign resource identifiers may follow the DID specification but may describe data resources instead of humans or organizations. Name data networking (NDN) and information-centric networking (ICN) may benefit from self-sovereign resource identities where data caches rely on data naming and metadata descriptions of data. A self-sovereign data name allows a consumer to establish which data pool is the authorized owner of the name (the self-sovereign identity) versus possible imposters. In examples disclosed herein, the edge architectures implement a decentralized and chaotic ecosystem of stakeholders that enter and exit the ecosystem without supervisory oversight. Value exchange is based on trust, and in a decentralized or chaotic environment, trust is established directly by each stakeholder. In the decentralized implementation, there is no reliance on a presumption of a trusted third party common to all stakeholders.

The example encryptor 908 of FIG. 9 encrypts a DSC object. In some examples, the encryptor 908 performs a homomorphic encryption. Homographic encryption is a form or encryption that allows computation on encrypted ciphertext data to generate an encrypted result which, when decrypted, matches the result of the operations as if they had been performed on the unencrypted plaintext data. For example, additive homomorphic encryption may be used in conjunction with privacy protecting counters used for tracking purposes (e.g., to track accesses to data while protecting the values of the data). The example encryptor 908 may also utilize homomorphic encryption when aggregating DSC objects without direct disclosure of content to the entity performing the aggregation. Additionally or alternatively, the example encryptor 908 may encrypt a DSC object using data protection keys. For example, the encryptor 908 may sign a provenance token with an entity key. Also, in some examples, the encryptor 908 may encrypt a DSC object with an archival class key stored on hard disc drive (HDD), solid state drive (SSD), tape, etc. of the processing device. Additionally or alternatively, the example encryptor 908 may encrypt a DSC object with an in-memory encryption key (e.g., multi-key total memory encryption (MKTME), INTEL™ software guard extension (SGX), INTEL™ trusted domain extensions (TDX), or with a user's own key using INTEL™ quick assist technology (QAT), INTEL™ key protection technology (KPT), and/or another form of cryptographic accelerator or key manager. Additionally or alternatively, integrity protection may be performed with a message authentication coding (MACing) key for in memory storage or isolation in a secure execution environment (e.g., root of trust, a virtual machine hypervisor, enclave, co-processor, FPGA design, graphic processor, microcontroller, peripheral device, etc.). In some examples, the encryptor 208 may hash local data objects and/or generate a cryptographic hash of labels of the local data object. A local data object is a unit of data (e.g. a data block, a blob, a file, a segment, a transaction record, etc.) corresponding to a new file.

The example data structure generator 910 of FIG. 9 generates the DSC data object. For example, when a new file is generated, the example data structure generator 910 generates a local data object and object metadata corresponding to the new file. The local data object corresponds to the working files corresponding to the file. The local data object may include file version numbers, grants of access to the file, records of access to the file, and revisions made to either. In some examples, the object metadata corresponds to the provenance assertion. In such examples, the object metadata includes metadata indicative of a value added to the data and/or the stakeholder identification. The data structure generator 910 adds tag-value structure and stakeholder identity to build the provenance token or DSC data object. In some examples, the data structure generator 910 adds the provenance token to the blockchain. Additionally, the example data structure generator 910 generates a hierarchical data structure (e.g., local Merkle tree) for a new file corresponding to a hash of the local data object as a leaf node and a cryptographic hash of the level of the local data object as the intermediate level nodes of the hierarchical data structure. In some examples, the data structure generator 910 may generate a local commit log to track versions for the new file. When the file is updated, the example data structure generator 910 can update the local commit log to identify the different versions of the new file that have been generated. In some examples, the data structure generator 910 generates a revision(s) log to track the revision(s) of the new file. When the file is updated, the example data structure generator 910 can update the revisions log to identify the revisions that were performed on the new file. In some examples, the data structure generator 910 packages the hierarchical data structure, local data objects, object metadata, revision log, and/or local commit log into a local DSC object that can be linked to the new file. In some examples, the data structure generator 910 may include tools in the DSC object for accessing and/or manipulating the data file linked to the DSC object or the DSC object itself.

The example proxy generator 912 of FIG. 9 establish a proxy identity using a certificate for a self-sovereign identity, thereby allowing individuals and/or entities to have ownership of their identifies and control over how their data is shared and/or used. In this manner, the identify holder can reveal only the necessary data for any given transaction or interaction. A blockchain participant may provide the certificates that the example proxy generator 912 uses to establish the proxy identity. The proxy identity, secured with the certificate, may protect elements identified and not obscured for access rights that correspond to the protected elements (e.g., a digital identifier that reveals and authorizes access to one's own medical records, or medical records associated with proxy identities registered as patients under one's care). DSC objects having self-sovereign identity to identify the self-contained DSC objects means that the object is also self-sovereign.

The proxy generator 912 selects the self-sovereign identification (ID) and sets the self-sovereign ID as the stakeholder identity for incorporation into the provenance token. The self-sovereign ID has no specific format or standard for formatting. Any sort of nomenclature may be used. The creator of the self-sovereign ID can select their own style or formatting and is not required to use or understand English. Though in some examples, there are some standards for selection of identifiers. The use of self-sovereign ID facilitates a dynamic evolution of the metadata.

In some examples, the proxy generator 912 determines if there is a conflict with a stakeholder identity. For example, if two stakeholders attempt to use the same self-sovereign ID, the proxy generator 912 determines which stakeholder has priority. For example, the proxy generator 912 can compare coordinate universal time (UTC) timestamps of when a self-sovereign ID was claimed to determine which stakeholder made the claim first. If proxy generator 912 determines that the processing device 812a in which it is incorporated does not have priority over a self-sovereign ID, the proxy generator 912 selects another self-sovereign ID.

The example encoder 916 of FIG. 9 encodes the DSC object. Data files correspond to different data encoding formats. For example, audio files are encoded as MP3, M4A, etc. Accordingly, if the data file corresponds to a particular encoding format, the example encoder 916 encodes the DSC object to match the encoding of the data file. The example encryptor 908 may further serialize content specific encodings (e.g., using cryptographic serialization) for secure conveyance between processing devices (e.g., using COSE, JOSE, CMW, CML signing, etc.). In some examples, the encoder 916 may encode some data for secure distribution. For example, the example encoder 916 may use data manipulation language (e.g., CDDL, JSON, XML, CBOR, ASN.1) to allow interoperability because the serialization technique is known by both encoders and decoders.

The example key generator 918 of FIG. 9 generates vouchers and/or data storage keys. For example, the key generator 918 may generate a voucher for limiting access to a file to particular devices. The key generator 918 generates a voucher to include the public key and/or trust anchor of another device in the system architecture 800 of FIG. 8. The voucher establishes which peer nodes are authorized to import the DSC object into their storage systems. The key generator 918 may generate the vouchers to also include a key wrapping key (e.g., RSA public keys for trusted entities). Vouchers may security link to a PDP and/or other related data object. For example, a DSC object may identify edge hosting resources where data are physically located, replicated, cached, etc. Any movement, reference counting increment/decrement and/or access grant may be gated by the root of trust that interprets the voucher. In some examples, the key generator 918 may generate data storage keys use to authenticate and/or attest a data pool.

The example object aggregator 920 of FIG. 9 updates the data supply chain. For example, the object aggregator 920 aggregates data from two or more DSC objects into a new DSC object corresponding to the two DSC objects. The object aggregator 920 may also generate and sign (e.g., for tracking and/or auditing) any data that is derived from child subtrees under a DSC object. Such data may include information that can be used to recreate a set of transformations, apply the set of transformations, and/or verify the net result of the transformations to produce a verifiable result over the data. For example, a component of the system 800 may record the operational lineage of a file with where the transformations of the file were performed, a timestamp, and signatures over the intermediate data. In such an example, even though the intermediate data may be transient and lost, the intermediate data may be recovered by performing the document transformations and verified against the signatures. This allows the example object aggregator 920 to debug, inspect, and/or generate greater confidence in the robustness of the data supply chain. When a DSC object is updated, the example object aggregator 920 adds a node to the leaf of a Merkle Tree that corresponds to changes in the file. Accordingly, the Merkle Tree updates with each access, edit, etc. to the data corresponding to the DSC object.

When aggregating data from two DSC objects, the example object aggregator 920 of FIG. 9 may add corresponding nodes to the Merkle Tree such that the new Merkel tree includes nodes that correspond to the nodes of the two DSC objects that have been aggregated. For example, if media C1 and C2 are inputs to a DSC object where a matrix multiply is applied to each byte of the media, the object aggregator 920 would produce a log/history identifying C1 and C2 (e.g., by obtaining a SSI, by computing a digest over label identifying C1, or by computing a digest over the C1 media directly). Metadata about the C1 and C2 may include its geolocation, who has copyright ownership, etc. A third media C3 may be generated that applies the matrix multiply transformation over C1 and C2. The metadata for C2 may describe the transformation function that was used, the location where the function was used, etc. When a transformation is applied the aggregator 920 and/or the example data structure generator 910 generates a revision. The resulting media revision object for C3 is hashed (e.g., using the encryptor 908) to produce a value that is included in the Merkle Tree. In some examples, it may be appropriate to allow multiple revisions of C2 before a final result is generated and added to the local Merkle Tree to allow for creative or random changes to occur without generating excessive entries in the Merkle Tree. The Merkle tree records workflow steps applied locally (e.g., received media C1, received media C2, applied transformation function F1, applied transformation function F2, generated media C3, etc.). The encryptor 908 hashes the root of the Merkle tree to generate a value representative of the current state of the DSC at the current time. Sub-tree nodes represent the state at an earlier point in time. By adding a local Merkle tree root to the blockchain, it is possible to serialize the state changes across multiple DSC objects. Subtrees of local object may occur in parallel. Thus, a serialization of subtree revisions may not be readily achievable. However, revision data can include a secure timestamp if that level of serialization is needed.

The example root of trust generator 922 performs hardware attestation on the processing device to develop a secure execution environment for generating and/or modifying a DSC object and deriving security descriptors and provenance from a DSC object. For example, the root of trust generator 922 may implement an INTEL™ SGX protocol to implement the attestation. The example root of trust generator 922 obtains (e.g., via the network interface 902) a root of trust from a transmitting processing device that transmits (e.g., via a wired or wireless connection) a DSC object (e.g., the processing device 804-810 that transmitted an obtained DSC object) prior to processing the data from the transmitting processing device. The attestation structure reveals the root of trust architecture (e.g., which could be based on the INTEL™ SGX protocol where the SGX enclave implements the local DSC (LDSC) function as well as the crypto serialization, signing and encryption). The example root of trust generator 922 performs the hardware attestation by finding a suitable root of trust based on the received attestation, booting operation into a storage data pool environment that is tied to the root of trust, and using the data storage keys to import (e.g., encrypt) the DSC object and place it under portable data pools control. When a processing device 802, 804, 806, 808, 810 operates as a trusted third party, the root trust generator 922 of such processing device 802, 804, 806, 808, 810 compute privacy functions to protect sensitive data.

The example object processor 924 of FIG. 9 processes DSC data objects received from the network 814. For example, the object processor 924 may verify a stakeholder and/or verify an owner certificate path with a public key in a voucher, log the reception and/or modification of the received DSC object, and load tools included in the DSC object. In some examples, the object processor 924 determines if the changes of a DSC object should be collapsed into a single monolithic change and/or if data transformations need to be compensated to debug the data of the DSC object.

When a stakeholder is not verified, the object processor 924 and/or object manager 812a and processing device 802, 804, 806, 808, 810 in general disregard the data and/or signal a warning that the stakeholder is not verified. When a stakeholder is verified, the object processor 924 and/or object manager 812*a* and processing device 802, 804, 806, 808, 810 in general utilize the data as available subject to the security restrictions.

DSC objects may include different types of data restrictions and/or security restrictions that limit use of the corresponding data. For example, data retention may be restricted. In some examples, secure methods for preventing retention of such data that is available from a data pool are built into an end-to-end digital rights management chain whose integrity is secured through verification of physical devices used for transmitting and displaying data. In some examples, data is never revealed in its clear (unencrypted) form except when accessed for computation, display, or transmission by a trusted platform that implements content rights protections.

Another counter-measure to data theft or illegal data retention is to limit, as part of supply chain operations, a maximum number of copies. In such examples, each copy may add a measure of ambiguity over data that can only be removed by the agency of a master data manager operating in a secure enclave. Example ambiguity includes downstream users being unable to apply a mashup if an upstream data owner or stakeholder can later delete data and/or restrict access. In some examples, the maximum number is controlled by the stakeholder, who can issue delete commands, and/or maintain a log of copies and deletions to manage the maximum number of copies.

In another example, restrictions based on time of use can be employed including establishing temporality and/or automatic expiration of time for data access and/or use. The temporal concept with the data supply chain can establish when data can be access and/or used, how long the data can be accessed and/or used, etc. Other restrictions may be based on geography, specific users, categories of users, categories of use, and/or other contract terms.

The example decryptor 926 of FIG. 9 decrypts a received DSC object based on the protocol used to encrypt the DSC object. For example, if the DSC object is encrypted using homomorphic encryption, the decryptor 926 decrypts using homomorphic decryption. In another example, if the DSC object is serialized, the example decryptor 926 can decrypt the DSC object based on the serialization protocol.

In the illustrated example of FIG. 9, the component interface 900 includes means for interacting and/or accessing data from other components of a processing device. In this example, the accessing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the component interface 900 implements the accessing means.

In the illustrated example of FIG. 9, the network interface 902 includes means for transmitting data, DSC objects, self-sovereign identification, and/or tag-value structure. In this example, the transmitting means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the network interface 902 implements the transmitting means.

In the illustrated example of FIG. 9, the filter 904 includes means for filtering raw data. In this example, the filtering means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the filter 904 implements the filtering means.

In the illustrated example of FIG. 9, the file processor 906 includes means for determining if a new file has been generated, determining a data from the file should be filtered, determining if the data in a new file includes sensitive data, determining if a DSC object is controlled using self-sovereign identity, determining whether a new file corresponds to a particular format or structure, linking a DSC object to a new file, determining that a DSC object and/or file is limited to a particular device. In this example, the determining and/or linking means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the file processor 906 implements the determining and/or linking means.

In the illustrated example of FIG. 9, the encryptor 908 includes means for encrypting data, anonymizes sensitive data, hashing local data objects, generating a cryptographic hash of a label of the local data object, determining if a DSC object includes data for full or homomorphic encryption, and/or performing full or homomorphic encryption. In this example, the encrypting, anonymizing, hashing, generating, determining, and/or performing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the encryptor 908 implements the encrypting, anonymizing, hashing, generating, determining, and/or performing means.

In the illustrated example of FIG. 9, the data structure generator 910 includes means for generating a local data object, object metadata, a hierarchical data structure, a local commit log, and/or a revision(s) log, wrapping the change management metadata, updating metadata, adding data transformation tools, logging DSC object detection, incrementing an access count, updating the hierarchical data structure, local commit log, and/or revision log, determining whether changes should be collapsed, collapsing the changes, generating data from child subtrees, building a tag-value structure, building a DSC object, and/or adding a DSC object to a DSC. In this example, the generating, adding, logging, updating, determining, building, and/or adding means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the data structure generator 910 implements the generating, adding, logging, updating, determining, building, and/or adding means.

In the illustrated example of FIG. 9, the proxy generator 912 includes means for establishing a proxy identifier, selecting a stakeholder and/or self-sovereign identity/identification, and/or verifying a priority of a self-sovereign identification. In this example, the establishing, selecting, and/or verifying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the proxy generator 912 implements the establishing, selecting, and/or verifying means.

In the illustrated example of FIG. 9, the encoder 916 includes means for encoding a DSC object and/or applying a data serialization format to a DSC object. In this example, the encoding and/or applying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the encoder 916 implements the encoding and/or applying means.

In the illustrated example of FIG. 9, the key generator 918 includes means for generating vouchers, generating data storage keys, and/or computing digest values. In this example, the generating and/or computing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the key generator 918 implements the generating and/or computing means.

In the illustrated example of FIG. 9, the object aggregator 920 includes means for debugging data of a DSC object, determining whether a first and second DSC object should be aggregated, and/or applying transitions to the first and second DSC object to generate a third DSC object. In this example, the debugging, determining, and/or applying means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples, the object aggregator 920 implements the debugging, determining, and/or applying means.

In the illustrated example of FIG. 9, the root of trust generator 922 includes means for finding a suitable root of trust, booting a root of trust environment, placing an encrypted DSC object under control of a storage data pool environment, deriving a provenance, and/or identifying a stakeholder. In this example, the finding, booting, placing, deriving, and/or identifying means is implemented by any processor structured to perform the corresponding operation by executing software or firmware, or hardware circuit (e.g., discrete and/or integrated analog and/or digital circuitry, an FPGA, a PLD, a FPLD, an ASIC, a trusted execution environment, a trusted zone, a domain isolated memory, a domain isolated processor, a comparator, a read latch, a read-write latch, a monotonic counter, a Unique Device Secret (UDS), a fuse, a Physically Unclonable Fuse (PUF), a strap, a soft-strap, a Read Only Memory (ROM), an operational-amplifier (op-amp), a logic circuit, etc.) structured to perform the corresponding operation without executing software or firmware, but other structures are likewise appropriate. In some examples, the root of trust generator 922 implements the finding, booting, placing, deriving, and/or identifying means.

In the illustrated example of FIG. 9, the object processor 924 includes means for verifying an owner certificate path, determining whether a DSC object includes data transformation tools, loading the tools, determining whether a file has been uploaded, determining if changes should be collapsed into a monolithic change, determining if a data transformation needs compensation, determining if auditing and/or tracking should be performed, determining if a stakeholder is verified, and utilizing data associated with a DSC. In this example, the determining, verifying, and/or utilizing means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples the object processor 924 implements the determining, verifying, and/or utilizing means.

In the illustrated example of FIG. 9, the decryptor 926 includes means for decrypting a DSC object. In this example, the decrypting means is implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate. In some examples the decryptor 926 implements the decrypting means.

While an example manner of implementing the example system 800, the example processing devices 802, 804, 806, 808, 810, the example object managers 812*a-e*, the example blockchain 816 and/or the example object monitoring service 818 of FIG. 8 is illustrated in FIGS. 8 and/or 9, one or more of the elements, processes and/or devices illustrated in FIGS. 8 and/or 9 may be combined, divided, re-arranged, omitted, eliminated and/or implemented in any other way. Further, the example component interface 900, the example network interface 902, the example filter 904, the example file processor 906, the example encryptor 908, the example data structure generator 910, the example proxy generator 912, the example encoder 916, the example key generator 918, the example object aggregator 920, root of trust generator 922, the example object processor 924, the example decryptor 926, and/or, more generally, the example processing devices 802, 804, 806, 808, 810, the example object managers 812a-e, the example blockchain 816 and/or the example object monitoring service 818 of FIGS. 8 and/or 9 may be implemented by hardware, software, firmware and/or any combination of hardware, software and/or firmware. Thus, for example, any of the example filter 904, the example file processor 906, the example encryptor 908, the example data structure generator 910, the example proxy generator 912, the example encoder 916, the example key generator 918, the example object aggregator 920, root of trust generator 922, the example object processor 924, the example decryptor 926, and/or, more generally, the example processing devices 802, 804, 806, 808, 810, the example object managers 812a-e, the example blockchain 816 and/or the example object monitoring service 818 of FIGS. 8 and/or 9 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example filter 904, the example file processor 906, the example encryptor 908, the example data structure generator 9910, the example proxy generator 912, the example encoder 916, the example key generator 918, the example object aggregator 920, root of trust generator 922, the example object processor 924, the example decryptor 926, and/or, more generally, the example processing devices 802, 804, 806, 808, 810, the example object managers 812a-e, the example blockchain 816 and/or the example object monitoring service 818 of FIGS. 8 and/or 9 is/are hereby expressly defined to include a non-transitory computer readable storage device or storage disk such as a memory, a digital versatile disk (DVD), a compact disk (CD), a Blu-ray disk, etc. including the software and/or firmware. Further still, the example video processing system 800 and/or the example processing devices 802, 804, 806, 808, 810, the example object managers 812a-e, the example blockchain 816 and/or the example object monitoring service 818 of FIGS. 8 and/or 9 may include one or more elements, processes and/or devices in addition to, or instead of, those illustrated in FIGS. 8 and/or 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10A:
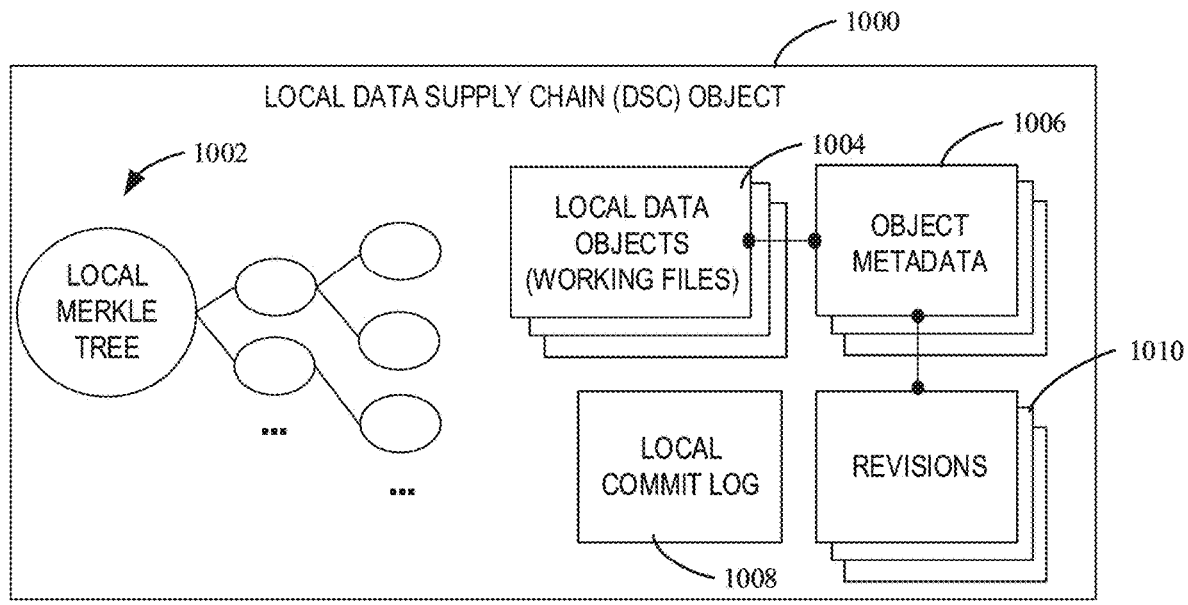
FIG. 10A illustrates an example data supply chain object.

FIG. 10A illustrates an example DSC object 1000 that can be generated and/or modified by the example object manager 812a of FIG. 9 (e.g., or one of the example object managers 812b-e of FIG. 8). The example DSC object 1000 includes an example local Merkle tree 1002, example local data objects 1004, example object metadata 1006, an example local commit log 1008, and an example revisions log 1010.

The example local Merkle tree 1002 of FIG. 10A corresponds to the data of the file that the DSC object 1000 is linked to. The Merkle tree simplifies verification of integrity over mutating data. A leaf node of the local Merkle tree 1002 is a hash of a unit of the data (e.g., a data block, a blob, a segment, a transaction record, etc.). The intermediate nodes of the local Merkle tree 1002 are cryptographic hashes of the labels of their respective child nodes (e.g., the leaf nodes). The example local Merkle tree 1002 allows for quick verification of data and any mutations over the data that have been labeled, hashed, and integrated cryptographically into a root of a subtree of the local Merkle tree 1002. Although the example local data supply chain object 1000 includes the example local Merkle tree 1002, any hierarchical security structure may be used.

Data corresponding to the example local data objects 1004 and the example object metadata 1006 (e.g., version numbers, grants of access, records of access, revision made to either, tec.) of FIG. 10A are reflected by the nodes of the example local Merkle tree 1002. Accordingly, the Merkle tree forms a system of interconnected data and metadata records that are protected (e.g., signed) by the corresponding codes in the local Merkle tree 1002 and reflect the history of the data corresponding to the DSC object 1000.

The example revisions log 1010 of FIG. 10A includes information that tracks the revisions made on the data (e.g., file) that is attached to the DSC object 1000. For example, if the data is an audio file and the audio file is edited by a sound engineer, the particular edits made by the engineer are documented in the revisions log 1010. The example local commit log 1008 corresponds to difference versions of the file (e.g., a saved version after one or more revisions of the file). Some or all the data in the example DSC object 1000 may be replicated using a consistent hash-based distributed data store (e.g., Ceph file system) or a high-performance distributed database (e.g., Couch DB, levelDB, RocksDB, etc.).

Figure 10B:
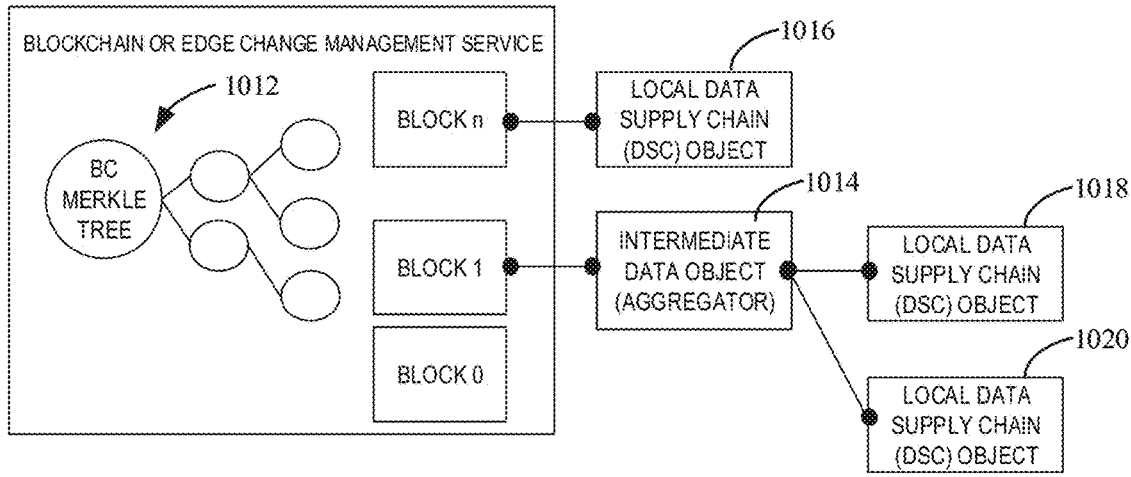
FIG. 10B illustrates an example blockchain Merkle tree that accepts data supply chain object updates as blockchain transactions.

FIG. 10B illustrates an example blockchain (BC) Merkle tree 1012 that the example blockchain 816 and/or the example object monitoring service 818 uses to track/monitor DSC objects as the DSC objects transition between the example processing devices 802, 804, 806, 808, 810 of FIG. 8. The blocks in FIG. 10B correspond to records of tracked DSC objects. Each block corresponding to a creation of a new DSC object (e.g., the hash of the record can uniquely identify the data object, or if it is an aggregated object then the block will include hashes of the combined object) or edits/changes to an already established data object (e.g., in this case the data object will be referenced by its hash, and the nature of the change will be recorded in the block).

The example BC Merkle tree 1012 includes transaction blocks that include signed hashes over the compositions, and any mutations (e.g., transformations) that may be performed on them. The example BC Merkle tree is maintained by the example blockchain 816 and/or the example object monitoring service 818 to observe protocols for verifying and adding blocks to the example BC Merkle tree 1012. Additionally, the example BC Merkle tree 1012 is maintained for executing any smart contracts in the process, according to whether the organization includes a public, private, or mixed blockchain system.

The example local DSC objects 1016, 1018, 1020 of FIG. 10B are structured the same as the example local DSC object 1000 of FIG. 10A. In the illustrated example, the example local DSC object 1016 (e.g., corresponding to Object A described above) is linked to Block n of the BC Merkle tree 1012. In the illustrated example, it is uncertain whether the other example local DSC objects 1018, 1020 (e.g., such as a DSC Object X and a DSC Object Y) are uniquely named and/or distinguished until both are contributed to the blockchain. For example, a first processing device (D1) may contribute Object X independently from a second processing device (D2) that may contribute Object Y. In some examples, the blockchain 816 and/or the example object monitoring service 818 may disambiguate Object X and Object Y using the device names for the respective devices contributing the corresponding DSC objects (e.g., D1.X and D2.X, where D2.X=Object Y). However, if the DSC objects are not owned by the entity/device that updated the blockchain, the object may be assigned its own unique name. In this example, the relative position establishes name ownership since Block 1 occurs before Block n. The example aggregated DSC object 1014 can assert the name X resulting in the local DSC object 1018 having to find a different name. In other examples, an objection identify creation may be implemented with an SSI system (E.g., Sovrin.org), where an SSI blockchain is used to establish ownership of an object name as a pre-requisite to contributing the DSC to the DSC blockchain 816. Additionally or alternatively, the blockchain 816 may be used to establish DSC object names by recording and checking for previous blocks including the duplicate names. Because names may be a digest of media, duplicate names may occur less often unless information of the DSC objects are identical. Uniqueness of object name does not necessarily mean infringement exists. Further analysis of the DSC information may be needed.

An example DSC object that can be generated and/or modified by the example object manager 812a of FIG. 9 (e.g., or one of the example object managers 812b-e of FIG. 8) can be built using the following example common development distribution license (CDDL) notation:

```
// Data and meta data are nested; with a first principal supplying a first
data and meta data my-data-supply-chain = {
    + my-data => data-entry,
    * $$data-extension
    + my-meta-data => meta-entry,
    * $$meta-extension
}
data-entry = {
    attribute1 => text,
    + attribute2 => integer,
    ? attribute3 => bool,
    attribute4-array => array-data / [2* array-data],
    // etc...
}
array-data {
    item1 => integer
    item2 => bstr
    // etc..
}
meta-entry = {
    meta1 => text,
    meta2 => integer,
    ? meta3 => bool,
    + meta4 => text,
    // etc...
}
// A second principal supplying a second data and metadata enveloping the
first data and metadata
    my-data2 = {
    + my-data2 => data2-entry,
    * $$data-extension
    + my-meta2-data => meta2-entry,
    * $$meta-extension
}
data2-entry = {
    attribute1 => text,
    attribute2 => integer,
    ? attribute3 => bool,
    + attribute4 => text,
    // etc...
}
```

```
meta2-entry = {
    meta1 => text,
    meta2 => integer,
    ? meta3 => bool,
    + meta4 => text,
    // etc...
}
/* Exemplary payloads that are cryptographically protected */
// Both data and meta data protected by the same principal payload = {
    my-data -supply-chain
}
// Data protected by a first principal and meta data protected by a second
principal
Payload1 = {
    my-data-supply-chain.my-data
}
Payload2 = {
    my-data-supply-chain.my-meta
}
/* see "payload" item in COSE crypto envelope structures to process
confidentiality and integrity protections associated with my-data */
```

Concise Binary Object Representation (CBOR) is a data format for small code size and small message size, which can be used in data security services. CBOR Object Signing and Encryption (COSE) is a corresponding communications protocol. An example CCDL notation for COSE crypto enveloping includes:

```
start = COSE_Messages / COSE_Key / COSE_KeySet / Internal_Types
; This is define to make the tool quieter
Internal_Types = Sig_structure / Enc_structure / MAC_structure /
    COSE_KDF_Context
label = int / tstr
values = any
COSE_Messages = COSE_Untagged_Message /
    COSE_Tagged_Message
COSE_Untagged_Message = COSE_Sign / COSE_Sign1 /
    COSE_Encrypt / COSE_Encrypt1 /
    COSE_Mac / COSE_Mac0
COSE_Tagged_Message = COSE_Sign_Tagged /
    COSE_Sign1_Tagged /
    COSE_Encrypt_Tagged / COSE_Encrypt1_Tagged /
    COSE_Mac_Tagged / COSE_Mac0_Tagged
Headers = (
    protected : bstr,     ; Contains a header_map
    unprotected : header_map
)
header_map = {
    Generic_Headers,
    ; Algorithm_Headers,
    * label => values
}
Generic_Headers = (
    ? 1 => int / tstr, ; algorithm identifier
    ? 2 => [+label], ; criticality
    ? 3 => tstr / int, ; content type
    ? 4 => bstr,    ; key identifier
    ? 5 => bstr,    ; IV
    ? 6 => bstr,    ; Partial IV
    ? 7 => COSE_Signature / [+COSE_Signature] ; Counter signature
)
COSE_Sign_Tagged = #6.991(COSE_Sign) ; Replace 991 with TBD1
COSE_Sign = [
    Headers,
    payload : bstr / nil,
    signatures : [+ COSE_Signature]
]
COSE_Signature = [
    Headers,
    signature : bstr
]
COSE_Sign1_Tagged = #6.997(COSE_Sign1) ; Replace 997 with TBD7
COSE_Sign1 = [
    Headers,
    payload : bstr / nil,
```

```
    signature : bstr
]
Sig_structure = [
    context: "Signature" / "Signature1" / "CounterSignature",
    body_protected: bstr,
    ? sign_protected: bstr,
    external_aad: bstr,
    payload: bstr
]
COSE_Encrypt_Tagged = #6.992(COSE_Encrypt) ; Replace 992 with TBD2
COSE_Encrypt = [
    Headers,
    ciphertext: bstr / nil,
    recipients: [+COSE_recipient]
]
COSE_recipient = [
    Headers,
    ciphertext: bstr / nil,
    ? recipients: [+COSE_recipient]
]
COSE_Encrypt1_Tagged = #6.993(COSE_Encrypt1) ; Replace 993 with TBD3
COSE_Encrypt1 = [
    Headers,
    ciphertext: bstr / nil,
]
Enc_structure = [
    context : "Encrypt" / "Encrypt1" / "Enc_Recipient" /
        "Mac_Recipient" / "Rec_Recipient",
    protected: bstr,
    external_aad: bstr
]
COSE_Mac_Tagged = #6.994(COSE_Mac)        ; Replace 994 with TBD4
COSE_Mac = [
    Headers,
    payload: bstr / nil,
    tag: bstr,
    recipients: [+COSE_recipient]
]
COSE_Mac0_Tagged = #6.996(COSE_Mac0)   ; Replace 996 with TBD6
COSE_Mac0 = [
    Headers,
    payload: bstr / nil,
    tag: bstr,
]
MAC_structure = [
    context: "MAC" / "MAC0",
    protected: bstr,
    external_aad: bstr,
    payload: bstr
]
COSE_Key = {
    key_kty => tstr / int,
    ? key_ops => [+ (tstr / int) ],
    ? key_alg => tstr / int,
    ? key_kid => bstr,
    * label => values
}
COSE_KeySet = [+COSE_Key]
;key_labels
key_kty=1
key_kid=2
key_alg=3
key_ops=4
PartyInfo = (
    ? nonce : bstr / int,
    ? identity : bstr,
    ? other : bstr,
)
COSE_KDF_Context = [
    AlgorithmID : int / tstr,
    PartyUInfo : [ PartyInfo ],
    PartyVInfo : [ PartyInfo ],
    SuppPubInfo : [
        keyDataLength : uint,
        protected : bstr,
        ? other : bstr
    ],
    ? SuppPrivInfo : bstr
]
```

Figure 11A:
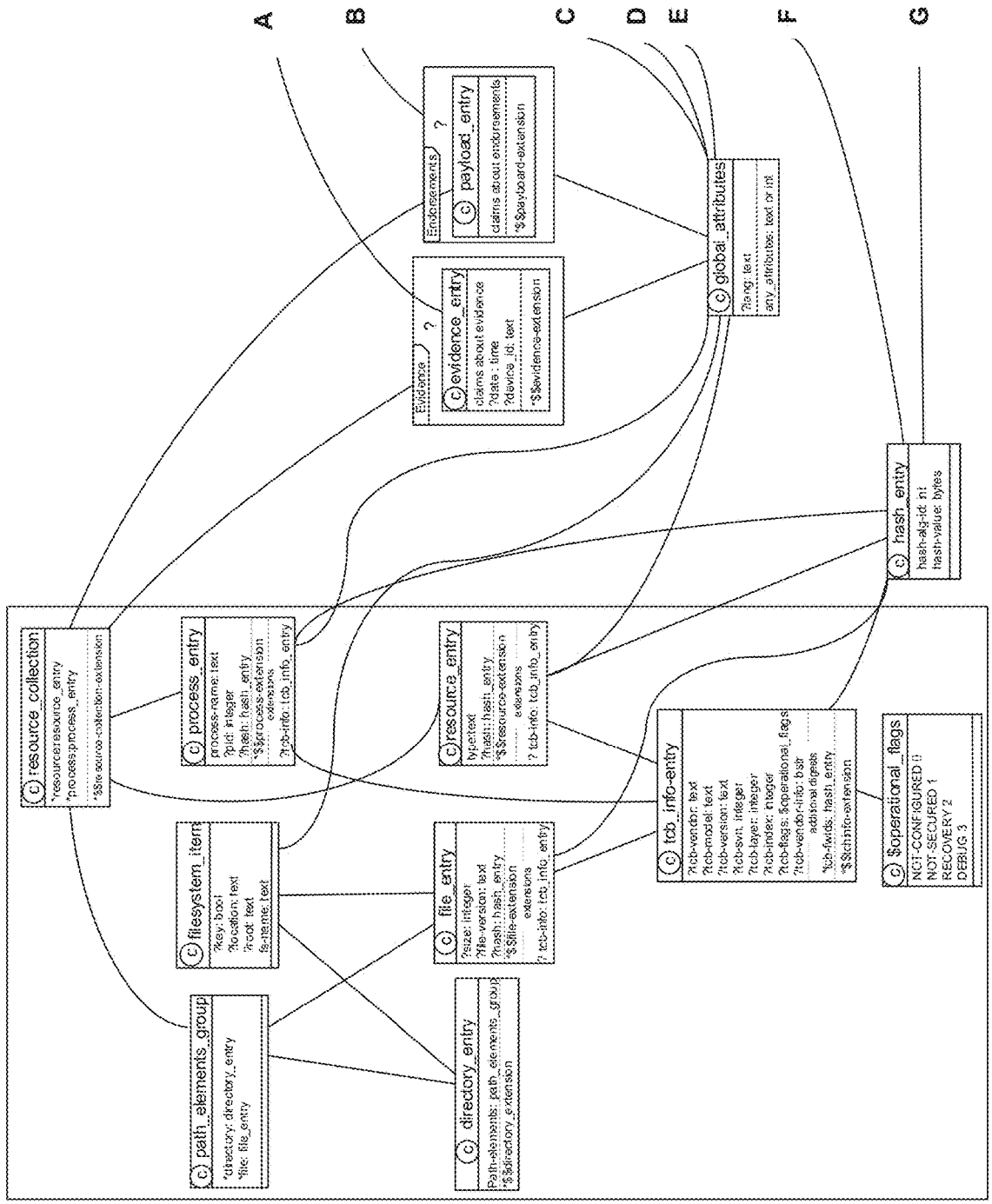
FIGS. 11A and 11B are a diagram of an example attestation schema.
Figure 11B:
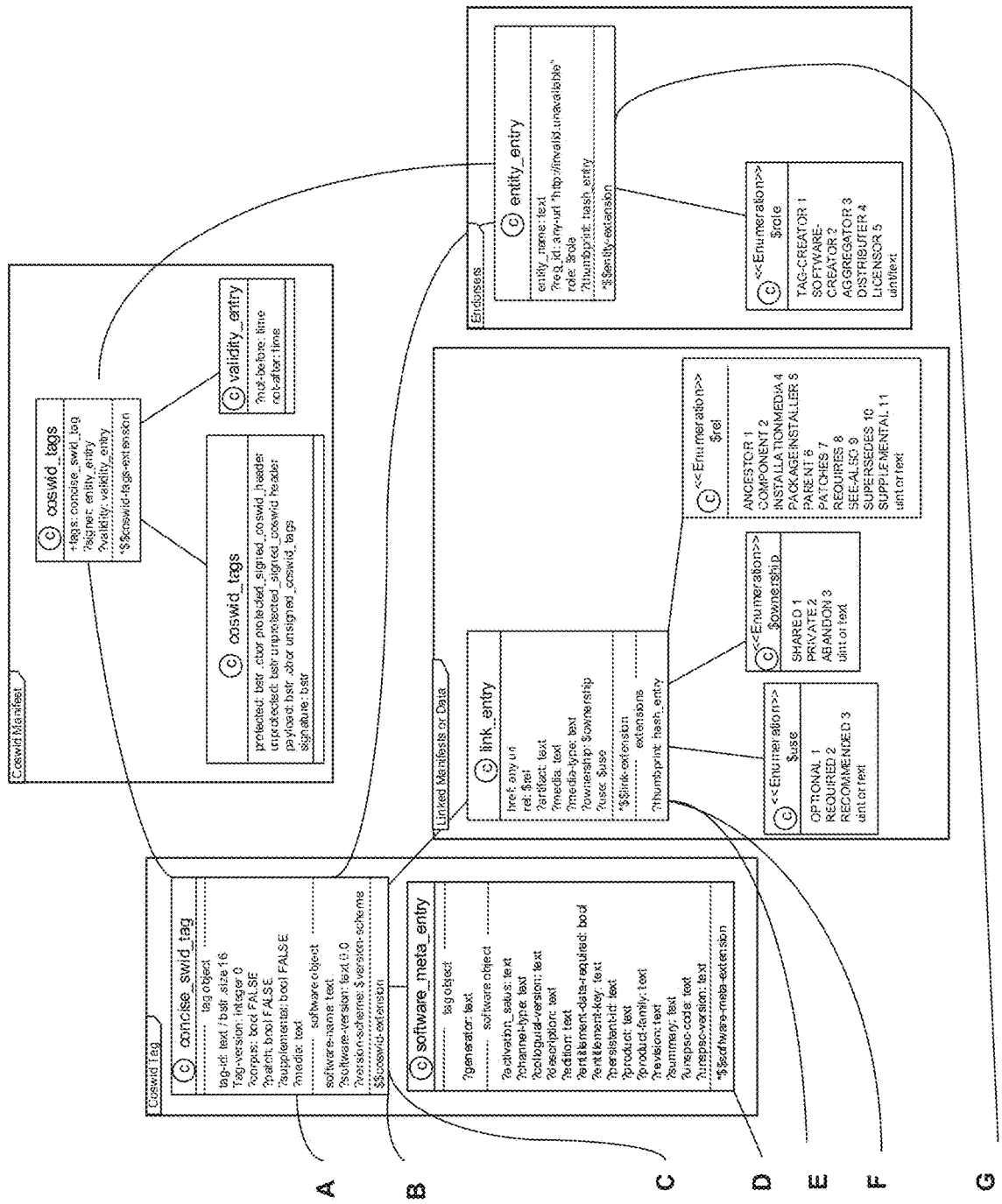

FIGS. 11A and 11B show an example attestation schema design in Unified Modeling Language (UML). The example schema design includes a Concise Software Identification Tags (CoSWID) Manifest r15 with Evolved Singer and TCBInfo. In the example, '?' means (0 or 1); means (0 to n); '+' means (1 to n). The example schema design represents a physical environment around which data is processed. The environment can be a trusted execution environment. The example schema design shows attributes of an attestable execution environment where tags describe a hierarchy of elements of the environment and where an Endorser entity may be a signer of a tag. In the illustrated example, a payload of a tag may contain data and metadata that are artifacts of the environment in addition to and/or in place of software, firmware, and/or hardware digest values. The data and metadata of the tag integrity protect and may confidentiality protect the payload.

An evidence class may use a same schema as a payload class to contain attestation evidence of the data and metadata that may include digests of the software, firmware, and/or hardware environments used to protect the data and metadata when not protected cryptographically. Thus, the illustrated example shows data and metadata protection in different layers. The schema design can be used for attestation of the data and/or attestation of the environment protecting the data.

Figure 11C:
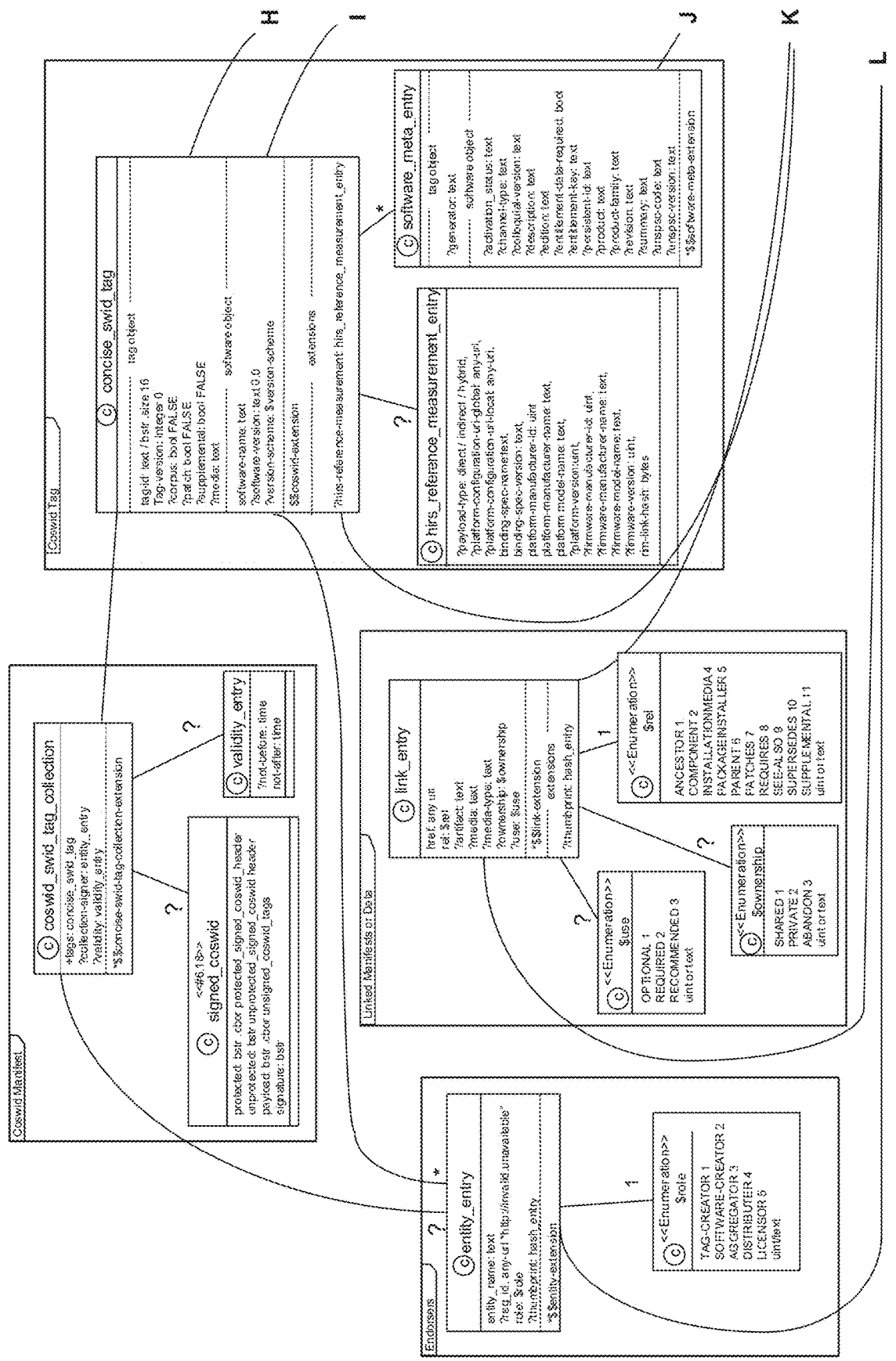
FIGS. 11C and 11D are a diagram of another example attestation schema.
Figure 11D:
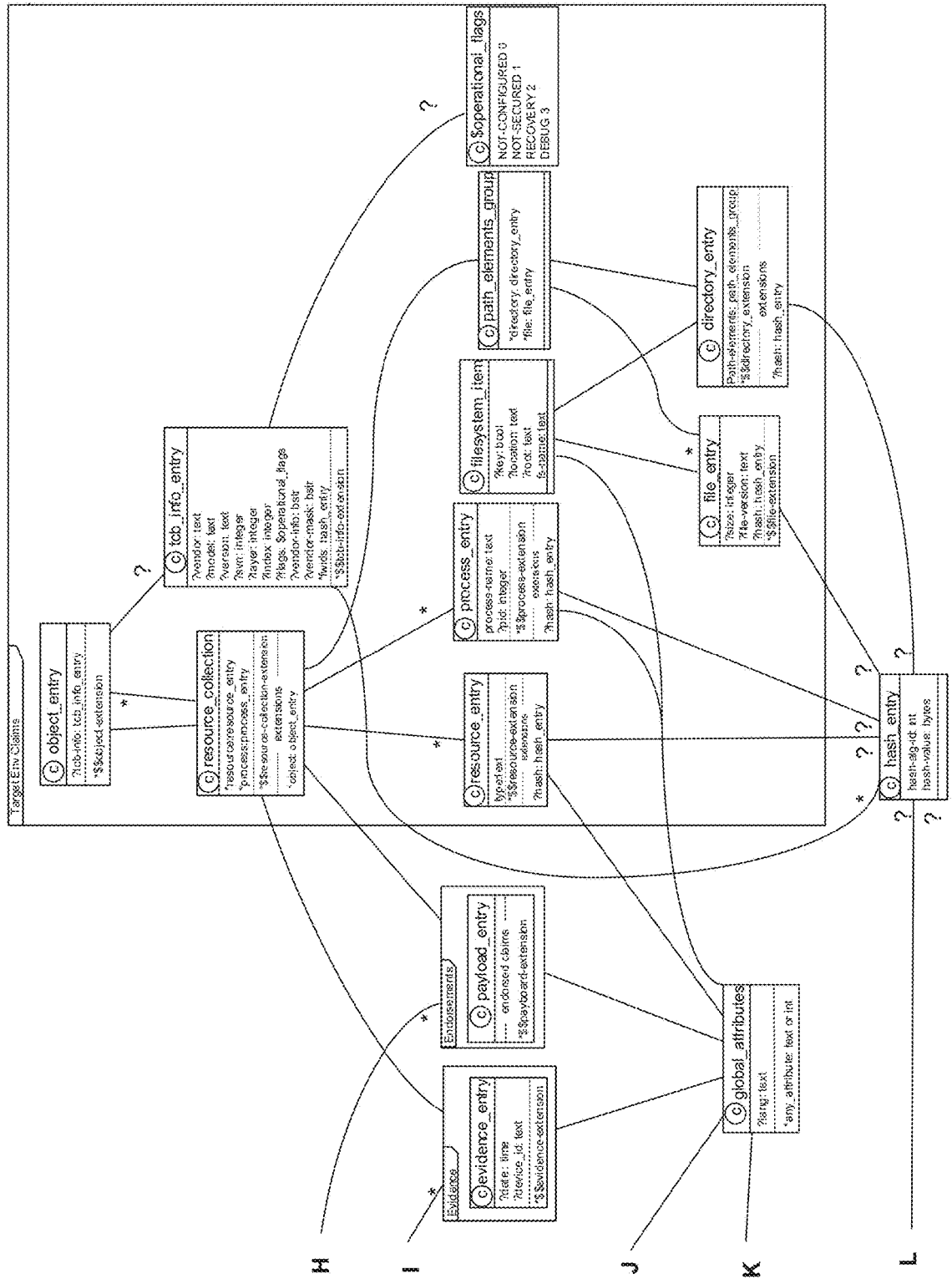

FIGS. 11C and 11D show another example attestation schema. FIGS. 11C and 11D shows a resource collection expressed as a hierarchy of 'object' that may instantiate a resource collection node (or sub-type of resource collection) as a generalized approach to encoding data and metadata associated with an object.

Figure 12:
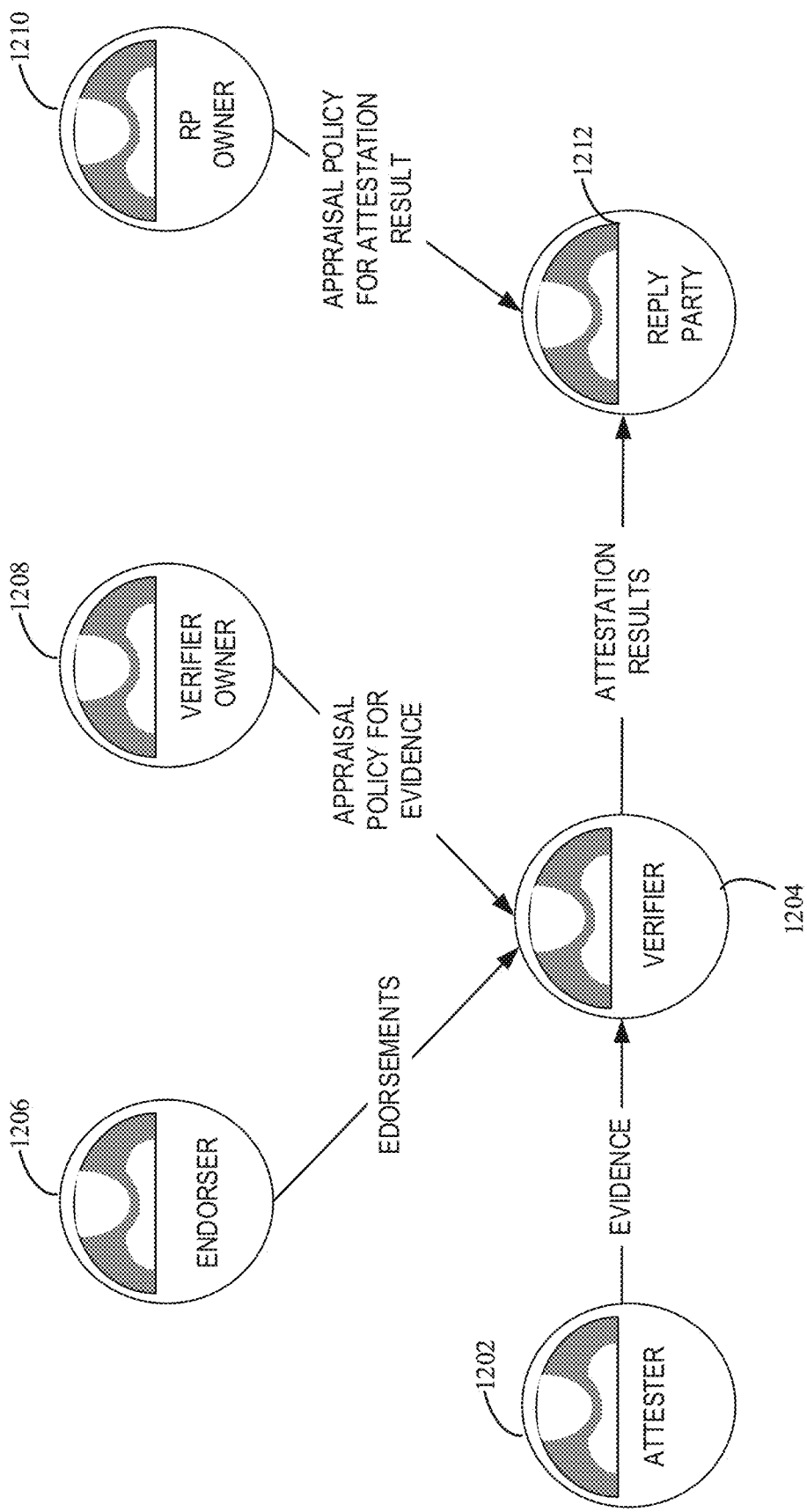
FIG. 12 is a diagram of example attestation roles and workflow.

FIG. 12 is a diagram of example attestation roles and workflow. The attestation roles architecture shown in FIG. 12 includes attestation Attesters, Endorsers, Verifiers and Relying Parties that cooperate to implement an attestation workflow that provides provenance of both data, metadata and the environments that protect data and metadata.

Attestation includes an Attester 1202 determining trustworthiness of the computer that is managing the DSC objects, which may be established prior to accepting a DSC object. In some examples, the Attester 1202 performs hardware attestation on the processing device to develop a secure execution environment for generating and/or modifying a DSC object. In this manner, a DSC object can be secured. For example, the DSC object can be put under portable data pool control, the DSC object can be encrypted and/or attested to a peer node using an attestation protocol. This attestation evidence is conveyed to a Verifier 1204.

An Endorser 1206 conveys endorsements to the Verifier 1204. For example, a device may be certified, and the Endorser 1206 provides the Verifier 1204 information related to the certification of the device, which extends to data generated and/or processed by the device. In some examples, a device may be certified with a security relevance. In such examples, the Endorser 1206 may provide reference measurements that describe attributes of devices with the security relevance.

A Verifier Owner 1208 provides appraisal policy for evidence to the Verifier 1204 for appraising the attestation evidence. The policy is the standards, guidelines, rules, and/or means by which the Verifier 1204 evaluates the evidence during the attestation determination.

The Verifier 1204 implements the appraisal policy to evaluate the attestation evidence in view of the endorsements. The Verifier 1204 determines the trustworthiness of the evidence. The Verifier 1204 produces attestation results based on the evaluation. In some examples, The Verifier 1204 walks a chain of attestation values that link an execution environment of a computer to a data object. In some examples, the Verifier 1204 is a third party that verifies terms of a contract were met by verifying signatures stored on the blockchain (such as hash values on the blockchain, signatures of devices agreeing to terms of a contract, etc.) as well as signatures of parties involved in the contract. In some examples, verifying terms of a contract may confirm fidelity to established contracts. In some examples, proof of contract establishment (such as verification of the contract in the blockchain) may be used to authorize a use of resources or an execution of a workload.

The Verifier 1204 may produce an attestation result that may be contributed to a blockchain. In other words, a blockchain processing node may be a Relying Party that applies a distributed consensus algorithm to agree that the attestation result was valid. This may be achieved by establishing trust relationships (trust anchors) between Verifiers and blockchain nodes (pairwise) or by combining Verifier role with blockchain nodes.

A Relying Party Owner 1210 provides appraisal policy for the attestation results to a Relying Parting 1212 for appraising the attestation results. The policy is the standards, guidelines, rules, and/or means by which the Relying Party 1212 evaluates the results of the attestation determination.

The Relying Party 1212 evaluates the attestation results in accordance with the appraisal policy for the attestation results to determine the trustworthiness of the transmitted data. When the evaluation determines the data to be trustworthy, the Relying Party 1212 can on the data and/or otherwise process the data. When the evaluation determines the data to be untrustworthy, the Relying Party 1212 can ignore the data, convey an error message, etc.

Also, in some examples, an attestation result value may be represented as a token such as, for example, a CBOR Web Token (CWT) that may be integrity protected using COSE. The token may be shared among a mesh or subscriber base of Relying Parties that may include nodes of a blockchain. Trust anchors may be used to authenticate the tokens. If the Relying Parties are blockchain nodes, the blockchain may serve as tokens having a hash tree that authenticates each block in the chain.

In some examples, one or more of the Attester 1202, the Verifier 1204, the Endorser 1206, the Verifier Owner 1208, the Relying Party Owner 1210, and/or the Relying Party 1212 can incorporate and/or be incorporated into the processing devices 802, 804, 806, 808, 810 and/or object managers 812*a-e* of FIGS. 8 and 9.

Figure 13:
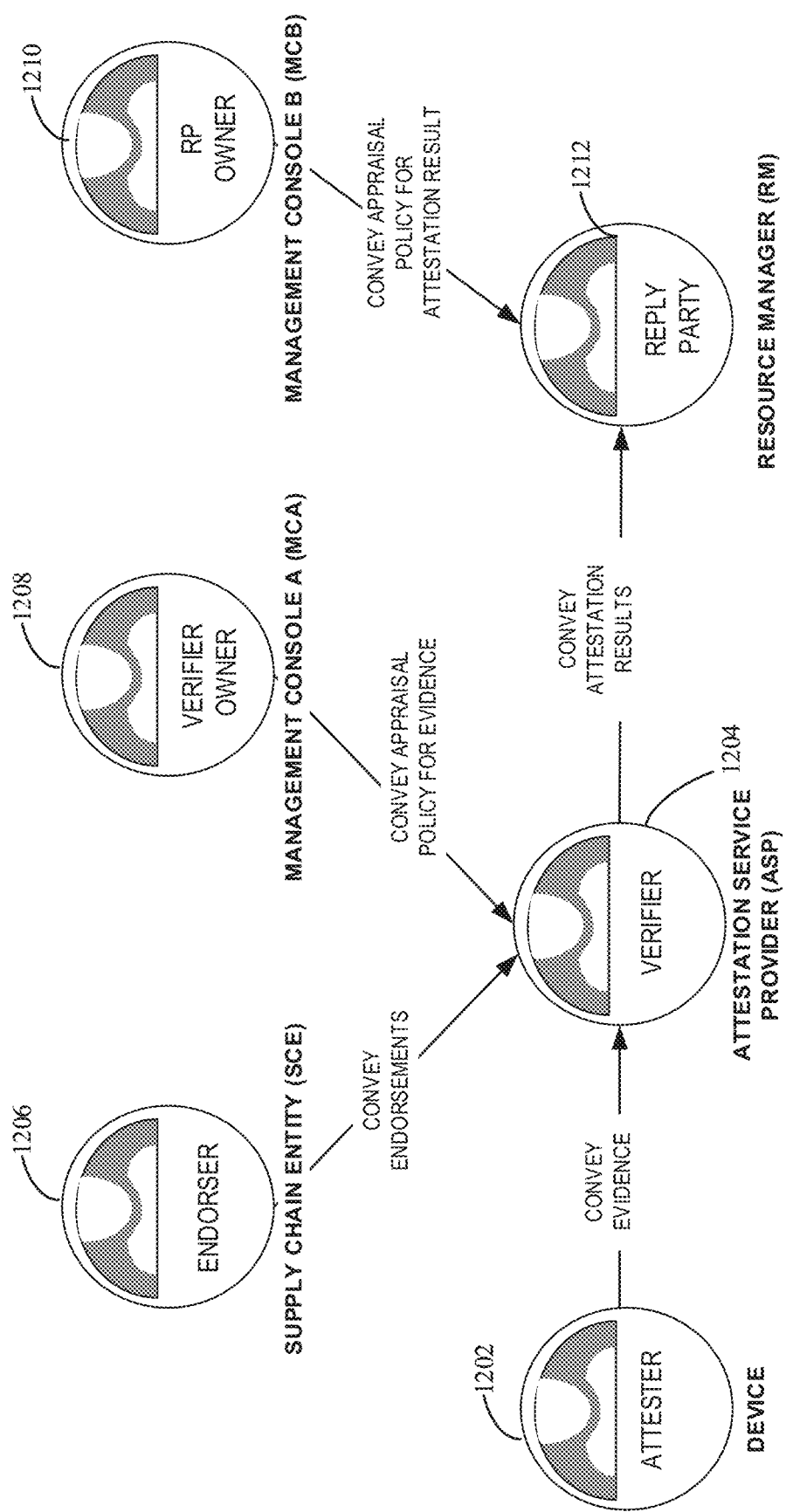
FIG. 13 is a diagram of example entities implementing the example attestation roles and workflow of FIG. 12.

FIG. 13 is a diagram of example entities implementing and/or hosting the example attestation roles and workflow of FIG. 12. For example, the Attestor 1202 may be a first device such as an IoT device, computerized device, etc. The Endorser 1206 may be a supply chain entity. The Verifier Owner 1208 may be a first management console. For example, the Verifier Owner 1208 may be the entity that has control over a service, but does not host a server. The Verifier 1204 may be an attestation service provider. In some examples, the Verifier 1204 is a cloud service. The Relying Party Owner 1210 may be a second management console. The Relying Party 1212 may be a resource manager, a stakeholder, and/or a second device such as an IoT device, computerized device, etc.

Figure 14:
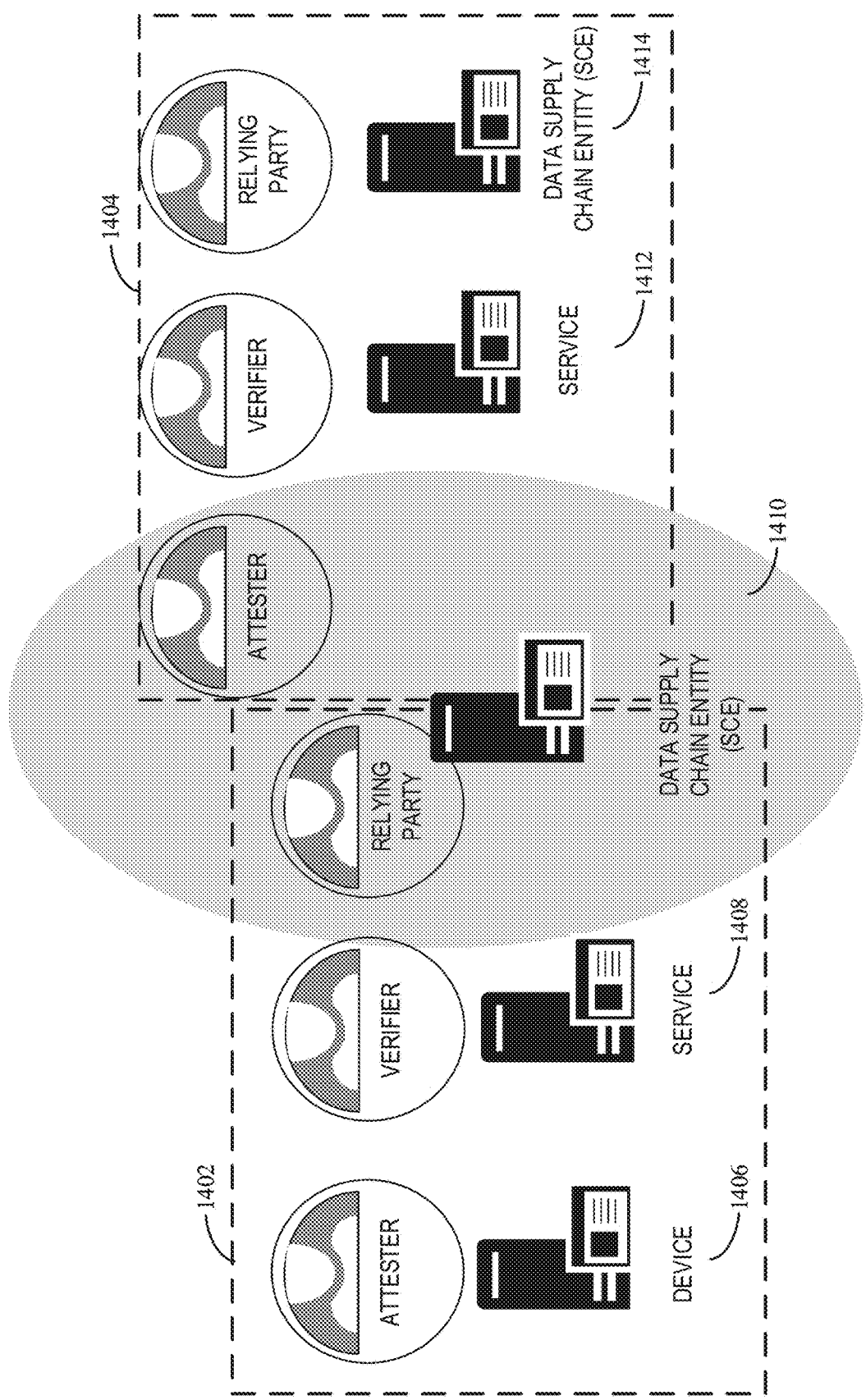
FIG. 14 is a diagram showing an example attestation cascading in a data supply chain.
Figure 17:
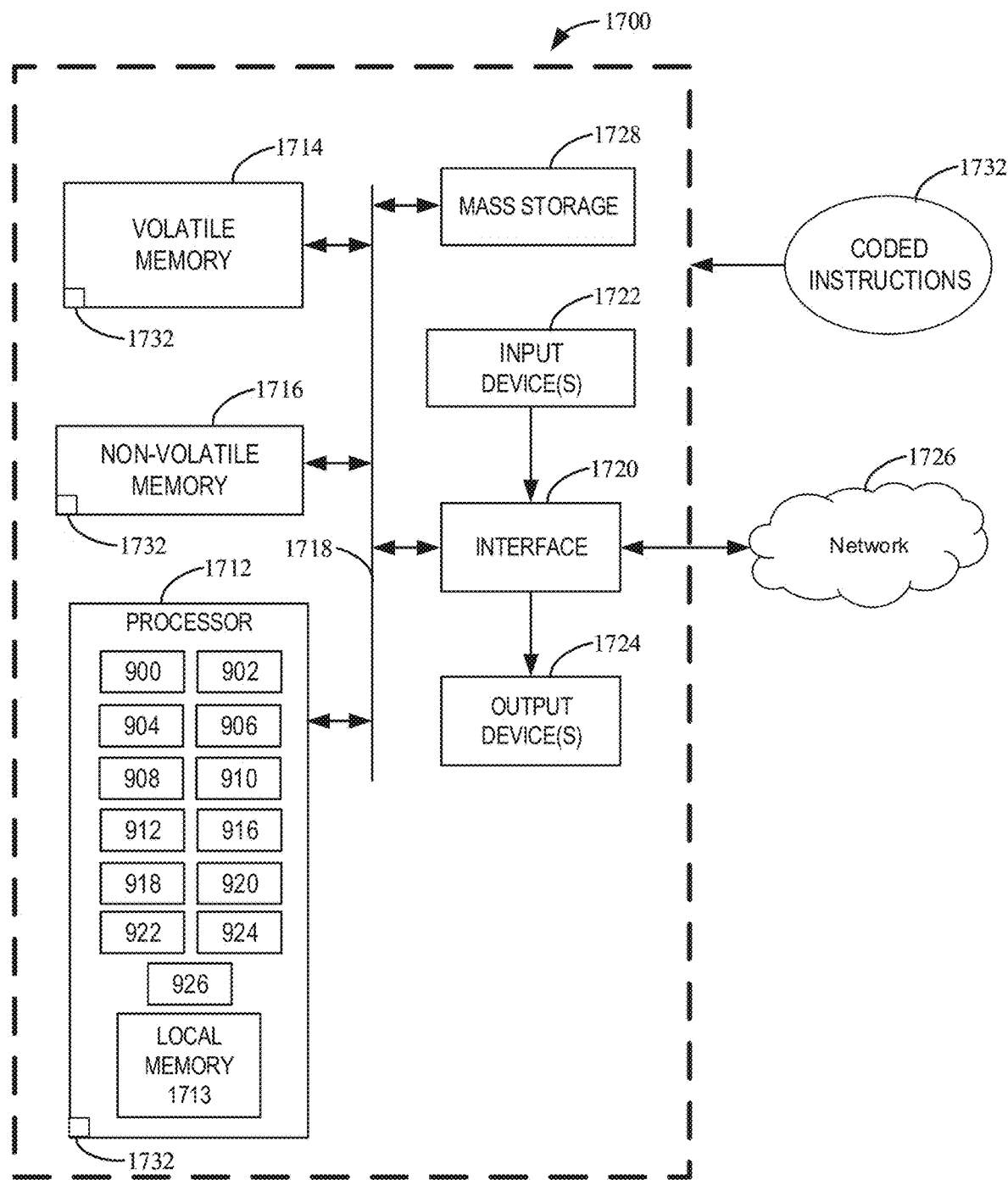
FIG. 17 is a block diagram of an example processing platform structured to execute the instructions of FIGS. 15 and 17 to implement the example object manager of FIGS. 8 and 9.

FIG. 17 is a diagram showing an example attestation cascading in a data supply chain. FIG. 14 shows a first attestation node or workflow 1402 cascading into a second attestation node or workflow 1404. The first attestation workflow 1402 provides provenance/trust regarding a first data supplier, which is shown as Attester device 1406. In this example, the Attester device 1406 performs the role of Attestor 1202. A first Verifier service 1408 performs the role of the Verifier 1204 to appraise the attestation evidence provided by the Attester device 1406 to produce attestation results indicative of the provenance/trust of the data provided by the Attester device 1406. The Verifier service 1408 may drill down into the nested data supply chain object to reveal another layer of evidence and endorsements pertaining to the handling of the data and/or metadata of the layers.

In the first attestation workflow 1402, the attestation results are conveyed to a first data supply chain entity 1410. In the first attestation workflow 1402, the first data supply chain entity 1410 performs the role of the Relying Party 1212. For example, the first data supply chain entity 1410 embodies and/or hosts a Relying Party that adds a data and/or metadata layer over first data/metadata object received from the Attester device 1406 to create second data/metadata.

The first data supply chain entity 1410 then enters the second attestation workflow 1404. The second attestation workflow 1404 provides provenance/trust regarding the second data/metadata generated, processed, and/or produced by the first data supply chain entity 1410. Thus, the first data supply chain entity 1410 switches from the role of the Relying Party 1212 to the role of the Attestor 1202. In the second attestation workflow 1404, the first data supply chain entity 1410 produces attestation results indicative of the provenance/trust of the second data/metadata. A second Verifier service 1412 performs the role of the Verifier 1204 to appraise the attestation evidence provided by the first data supply chain entity 1410. In some examples, the second Verifier service 1412 and the first Verifier service 1408 are the same.

In the second attestation workflow 1404, the attestation results are conveyed to a second data supply chain entity 1414. The second data supply chain entity performs 1414 the role of the Relying Party 1212. For example, the first data supply chain entity 1410 embodies and/or hosts a Relying Party (e.g., a second Relying Party) that adds a data and/or metadata layer over the second data/metadata object received from the first data supply chain entity 1410 to create third data/metadata. The workflow can cascade into a third attestation workflow and so forth to produce an infinite cascade of attested enveloped data and/or metadata.

Flowcharts representative of example hardware logic, machine readable instructions, hardware implemented state machines, and/or any combination thereof for implementing the object manager 812*a* of FIG. 9 are shown in FIGS. 15 and 16. The machine readable instructions may be one or more executable programs or portion(s) of an executable program for execution by a computer processor and/or processor circuitry, such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example programs are described with reference to the flowcharts illustrated in FIGS. 15 and 16, many other methods of implementing the example object manager 812a may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 15 and 16 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 15 shows an example program 1500 for decentralized provenance assertion. The example program 1500 of FIG. 15 includes the component interface 900 of the object manager 812a accessing data (block 802). In the example programs 1500 and 1600 of FIGS. 15 and 16, the disclosure related to data is understood to also include the associated metadata. In some examples, the data is data that is generated by the processing device 802 in which the object manager 812a resides. For example, the processing device 802 may be a computing device that is used to create music. In some examples, the accessed data is data that is produced by another device (block Y) and imported or otherwise received or accessed by the processing device 802. For example, the data could be a music track that was recorded and imported from another device.

The program 1500 also includes the processing device 802 in general and/or the data structure generator 910 adding value to the data (block 1504). For example, the data structure generator 910 could remix the music track and/or otherwise alter the track.

The data structure generator 910 builds a provenance token (block 1506). The data structure generator 910 adds a tag-value structure to build the provenance token (block 1508). The tag-value structure is a claim to the value added. The tag identifies the type of content or transformation supplied by the processing device 802. The value includes reference to the content, algorithm, and/or other value added. For example, the data structure generator 910 include a tag-value structure that identifies media content as the music track or a portion of the music track and identifies the changes made to the music track by the processing device 802.

The data structure generator 910 also adds stakeholder identity (block 1510) to build the provenance token (block 1506). The stakeholder identity is generated by the proxy generator 912. For example, the proxy generator 912 selects a self-sovereign identification (ID) for use in the provenance token to identify the processing device 802 (block 1512). In some examples, the self-sovereign ID is selected by the stakeholder without the clearance or authorization of a centralized facility such as, for example, a trusted third party common to the processing devices 802, 804, 806, 808, 810 of the system architecture 800. The proxy generator 912 sets the self-sovereign ID as the stakeholder identity (block 1514). The data structure generator 910 builds the provenance token based on the stakeholder identity, as disclosed above.

The proxy generator 912 also determines whether there is a conflict with a stakeholder identity (block 1516). For example, two users or two processing devices may assert the same self-sovereign ID that is set as their respective stakeholder identities. If the proxy generator 912 determines that there is no conflict with a stakeholder identity (block 1516: NO), the data structure generator 910 adds the provenance token to the blockchain (block 1518). In some examples, the encoder 916 or the aggregator 920 add the provenance token to the blockchain. The provenance token is a new hash that incorporates the older material. Thus, the new hash includes a first digest of the data before the processing device 802 added value and a second digest of the data after the processing device 802 added value. Thus, provenance token builds onto the blockchain and adds identification the new data/metadata and its source.

If the proxy generator 912 determines that there is conflict with a stakeholder identity (block 1516: YES), the proxy generator 912 determines which entity or device has priority over of the stakeholder identity (block 1520). For example, the proxy generator 912 may investigate timestamp data indicative of when the respective devices established their self-sovereign IDs. In some examples, the timestamps are compared based on coordinate universal time (UTC) to account for devices being located in different geographic regions. The proxy generator 912 determines if the processing device 802, which executing the example program 1500 to assert provenance has priority (block 1522). If the processing device 802 executing the program 1500 does not have priority to the stakeholder identity (block 1522: NO), the program 1500 continues with the proxy generator 912 selecting a different self-sovereign ID (block 1512).

If the proxy generator 912 determines that processing device 802 executing the program 1500 has priority to the stakeholder identity (block 1522: YES), the program 1500 continues with the data structure generator 910, encoder 916, and/or aggregator 920 adding the provenance token to the blockchain (block 1518).

The encryptor 908 signs the provenance token with the entity key (block 1524). The program 1500 also includes the network interface 902 distributing or transmitting the data with the updated blockchain to other devices/networks (block 1526). Thus, the blockchain, with the provenance assertion of the processing device 802 is cascaded to other workflows (block X).

FIG. 16 shows an example program 1600 for provenance and data restriction determination. The program 1600 includes the component interface 900 accessing data (block 1602). The component interface 900 may be part of the object manager 812a of the processing device 802 disclosed above, or part of an object manager 812b-e of another processing device 804, 806, 808, 810. To illustrate the cascading nature of the data, metadata, and blockchain, the program 1600 of FIG. 16 will be described as occurring on a processing device different than the processing device executing the program 1500 of FIG. 15. Though, any processing device 802, 804, 806, 808, 810 disclosed here is structured, programmed, adapted, and/or configured to execute either program 1500 and/or program 1600. The data accessed by the component interface 900 may be data generated by the processing device 808 executing the program 1600 or may be data cascading over the network 814 such as the data generated and distributed by the processing device 802 executing the program 1500 (block X). In other examples, the data from an outside device (represented by block X) may be any other processing device.

The example program 1600 includes the root trust generator 922 deriving security descriptors (block 1604). The security descriptors are data structure in the blockchain that include security information. Security information includes provenance information and details related to security and/or data use restrictions. The root trust generator 922 derives the supply chain data provenance from the security descriptors (block 1606). In some examples, trusted third parties are leveraged to act as computation brokers or proxies to perform an operation or computation over self-sovereign data. In such examples, data does not cross various sensitive perimeters, side-effect free functions are sent in the opposite direction to compute and return certain permitted results over self-sovereign data. Thus, for example, sensitive personally identifiable data may not leave a particular location (e.g., a health center, a financial institution), value may be obtained from such data by returning results of functions that are known to be privacy protecting (for example, functions that return permitted statistics such as correlations among health and disease factors, or a distributions of asset mixes in the institution's portfolio holdings). Such computations may be performed by the trusted third parties, which act to separate the consumers (e.g., the processing device executing the program 1600) from the data that is protected by self-sovereignty controls over it.

In this example, the trusted third party may be, for example, another processing device 802, 806, 808, 810 and/or the object monitoring service 818. The component interface 902 of the trusted third party accesses data (block 1608). The root trust generator 922 of the trusted third party computes a privacy function (block 1610). The network interface 902 of the trusted third party returns the computation result (block 1612). The root trust generator 922 of the processing device 804 executing the program 1600 uses the computation result to derive provenance (block 1606).

The object processor 924 of the processing device 804 executing the program 1600 verifies from the stakeholder from the provenance (block 1614). The object processor 924 determines if the stakeholder is trusted or verified (block 1616). If the stakeholder is not trusted or verified (block 1616: NO), the object processor 924 and/or the object manager 812a and/or processing device 804 in general disregards the data and/or signals a warning (block 1618). The example program 1600 then ends.

If the stakeholder is trusted or verified (block 1616: YES), the object processor 924 and/or the object manager 812a and/or processing device 804 in general utilizes the data in accordance with the security and/or data restrictions identified in the security descriptors (block 1620). For example, the processing device 804 can use the data for a certain time period, for certain uses, under specified contract terms, etc.

The data structure generator 910, encoder 916, and/or object aggregator 920 updates the data supply chain in accordance with the use of the data (block 1622). The updated supply chain is cascaded to other workflows (block Y).

Block X and Block Y are used herein to show the import of a data supply chain from an outside device and a distribution of a data supply chain to an outside device. Though this description uses the processing device 802 as executing the instructions or program 1500 of FIG. 15 and the processing device 804 as executing the instructions or program 1600 of FIG. 16, it is to be understood that any processing devices may execute either program 1500, 1600. The execution of the programs 1500, 1600 and relatedness of the programs 1500, 1600 is not limited to two devices. Rather, the programs 1500, 1600 may be used to cascade an expanding data supply chain to a third device, a fourth device, and so forth.

FIG. 17 is a block diagram of an example processor platform 1700 structured to execute the instructions of FIGS. 15 and 16 to implement the object manager 812a of FIG. 9 and/or the object managers 812b-e of FIG. 8. In some examples, the processor platform 1700 can be used to implement an Edge node in an edge computing environment. The processor platform 1700 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1712 implements the example filter 904, the example file processor 906, the example encryptor 908, the example data structure generator 910, the example proxy generator 912, the example encoder 916, the example key generator 918, the example object aggregator 920, root of trust generator 922, the example object processor 924, and the example decryptor 926.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface. In this example, the interface circuit 1730 implemented the example network interface 902 of FIG. 9.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 15 and 16 may be stored in the mass storage device 1728, in the volatile memory 1714, in the non-volatile memory 1716, and/or on a removable non-transitory computer readable storage medium such as a CD or DVD.

Figure 18:
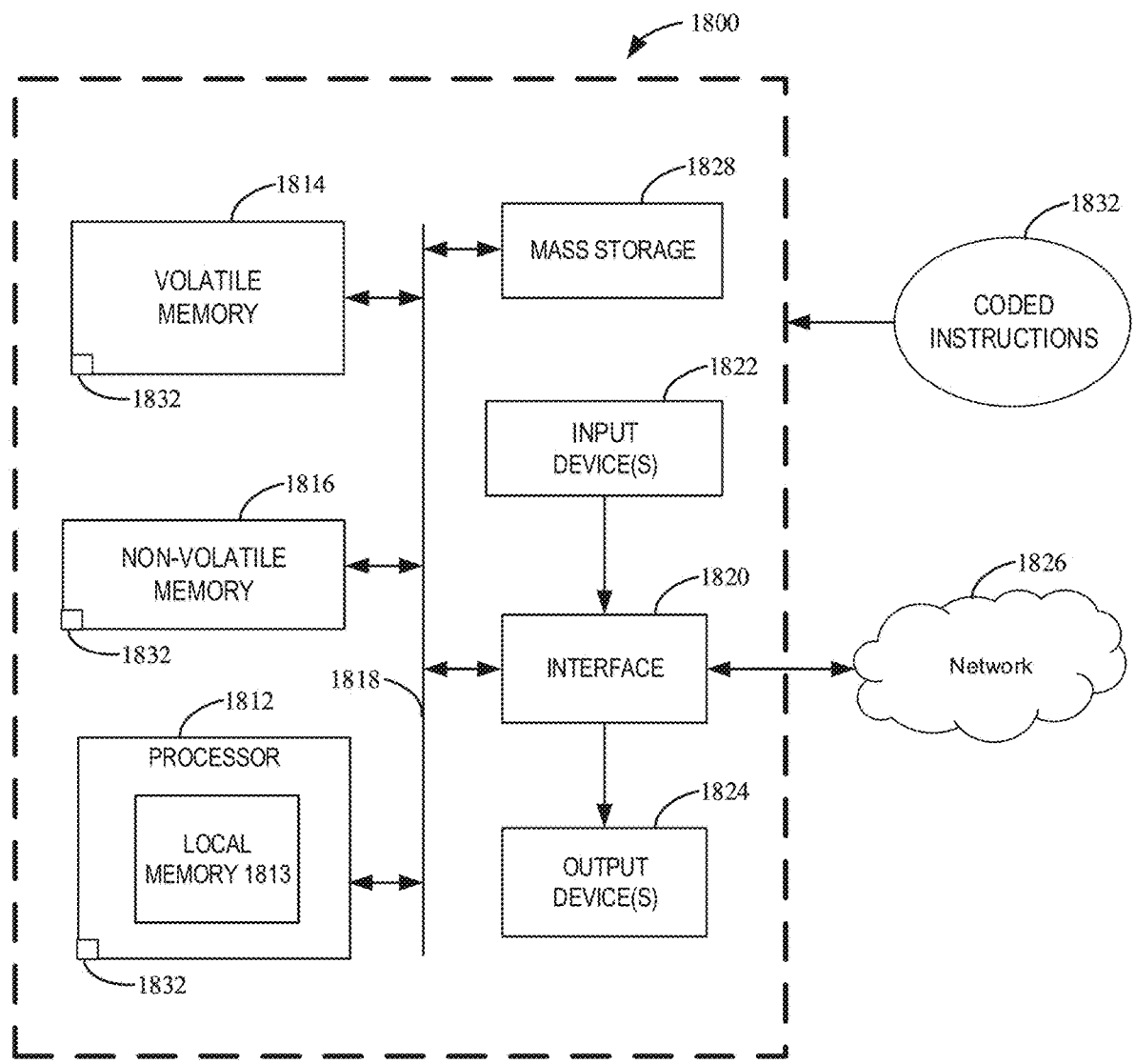
FIG. 18 is a block diagram of an example processing platform structured to implement the example blockchain and/or object monitoring service of FIGS. 8 and 9.

FIG. 18 is a block diagram of an example processor platform 1800 structured implement the example blockchain 816 and/or the example object monitoring service 818 of FIG. 8. In some examples, the processor platform 1800 can be used to implement an Edge node in an edge computing environment. The processor platform 1800 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device.

The processor 1812 of the illustrated example includes a local memory 1813 (e.g., a cache). The processor 1812 of the illustrated example is in communication with a main memory including a volatile memory 1814 and a non-volatile memory 1816 via a bus 1818. The volatile memory 1814 may be implemented by SDRAM, DRAM, RDRAM® and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a USB, a Bluetooth® interface, an NFC interface, and/or a PCI express interface. In this example, the interface circuit 1830 implemented the example network interface 202 of FIG. 2.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., an LED, an OLED, an LCD, a CRT display, an IPS display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a DSL connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, hard drive disks, compact disk drives, Blu-ray disk drives, RAID systems, and DVD drives.

The machine executable instructions 1832 of FIG. 18 may be stored in the mass storage device 1828, in the volatile memory 1814, in the non-volatile memory 1816, and/or on a removable non-transitory computer readable storage medium such as a CD or DVD.

From the foregoing, it will be appreciated that example systems, methods, apparatus, and articles of manufacture have been disclosed that enable stakeholders to select self-sovereign identification for decentralized provenance assertion and to add that identification and a tag-value structure to a data supply chain. The disclosed systems, methods, apparatus and articles of manufacture improve the efficiency of using a computing device by facilitating tracking of various types of data, thereby allowing media creators to protect intellectual property rights in a distributed and decentralized data ecosystem. Examples disclosed herein allow media owners to independently audit inferences generated by AI-driven entities. Examples disclosed herein provide automatic merges of data that results in new compositions that can be tracked through a data supply chain. Examples disclosed herein provide a computational infrastructure that can host a decentralized workload and provide AI platform security components for enhancing security of the system and the data being processed within the system. The disclosed methods, apparatus and articles of manufacture are accordingly directed to one or more improvement(s) in the functioning of a computer.

Adding provenance in a decentralized manner enables a dynamic expansion of metadata nomenclature, which enhances user operability and does not require content owners to apply a specific and often English-based set of standards. Data provenance is important in establishing the trustworthiness of data, how fresh the data is, accuracy, completeness, confidentiality, integrity, etc. The examples disclosed herein have beneficial implementation in the healthcare and financial industries for protecting private data while authenticating provenance and thus, trust, in the source of the data.

Example methods, apparatus, systems, and articles of manufacture to determine provenance for data supply chains are disclosed herein. Further examples and combinations thereof include the following: Example 1 includes a non-transitory computer readable storage medium comprising data which may be configured into executable instructions and, when configured and executed, cause one or more processors to at least: derive a provenance of a first data supply chain object; identify a first stakeholder from the provenance; determine if the first stakeholder is verified; utilize data associated with the data supply chain when the first stakeholder is verified; build a tag-value structure based on the utilization of the data; build a second data supply chain object based on the tag-value structure and an identity of a second stakeholder; and add the second data supply chain object to the data supply chain.

Example 2 includes the computer readable storage medium of Example 1, wherein the instructions cause the one or more processors to transmit the data and the second data supply chain object to a device that requested access to the data.

Example 3 includes the subject matter of any one or more of Examples 1 and/or 2 and optionally the instructions causing the one or more processors to derive the provenance based on a trusted third party privacy function.

Example 4 includes the subject matter of any one or more of Examples 1-3 and optionally the instructions causing the one or more processors to select the second stakeholder identity based on self-sovereign identification.

Example 5 includes the subject matter of any one or more of Examples 1-4 and optionally includes the self-sovereign identification being developed by the second stakeholder.

Example 6 includes the subject matter of any one or more of Examples 1-5 and optionally includes the instructions causing the one or more processors to bypass a central repository to select the second stakeholder identity.

Example 7 includes the subject matter of any one or more of Examples 1-6 and optionally includes the instructions causing the one or more processors to verify priority of the self-sovereign identification to the second stakeholder.

Example 8 includes the subject matter of any one or more of Examples 1-7 and optionally includes the self-sovereign identification being a first self-sovereign identification and the instructions causing the one or more processors to select a second self-sovereign identification when the second stakeholder lacks priority to the first self-sovereign identification.

Example 9 includes the subject matter of any one or more of Examples 1-8 and optionally includes the instructions causing the one or more processors to transmit the self-sovereign identification and the tag-value structure to one or more other devices for evaluation of nomenclature of the self-sovereign identification and the tag-value structure.

Example 10 includes the subject matter of any one or more of Examples 1-9 and optionally includes the instructions causing the one or more processors to transmit the second data supply chain object to at least one of a blockchain or an object monitoring service to at least one of (a) enforce a contract corresponding to the data, (b) record revisions to the data, (c) enforce data provenance, or (d) track the data.

Example 11 includes a system to generate a data supply chain object, the apparatus comprising: a root trust generator to: derive a provenance of a first data supply chain object; and identify a first stakeholder from the provenance. The system of Example 11 also includes an object processor to: determine if the first stakeholder is verified; and utilize data associated with the data supply chain when the first stakeholder is verified; and a data structure generator to: build a tag-value structure based on the utilization of the data; build a second data supply chain object based on the tag-value structure and an identity of a second stakeholder; and add the second data supply chain object to the data supply chain.

Example 12 includes the system of Example 11, further including a network interface to transmit the data and the second data supply chain object to a device that requested access to the data.

Example 13 include the subject matter of any one or more of Examples 11 and/or 12 and optionally includes the root trust generator to derive the provenance based on a trusted third party privacy function.

Example 14 includes the subject matter of any one or more of Examples 11-13 and optionally includes a proxy generator to select the second stakeholder identity based on self-sovereign identification.

Example 15 includes the subject matter of any one or more of Examples 11-14 and optionally includes the self-sovereign identification being developed by the second stakeholder.

Example 16 includes the subject matter of any one or more of Examples 11-15 and optionally includes the proxy generator to bypass a central repository to select the second stakeholder identity.

Example 17 includes the subject matter of any one or more of Examples 11-16 and optionally includes the proxy generator to verify priority of the self-sovereign identification to the second stakeholder.

Example 18 includes the subject matter of any one or more of Examples 11-17 and optionally includes the self-sovereign identification being a first self-sovereign identification, and the proxy generator to select a second self-sovereign identification when the second stakeholder lacks priority to the first self-sovereign identification.

Example 19 includes the subject matter of any one or more of Examples 11-18 and optionally includes a network interface is to transmit the self-sovereign identification and the tag-value structure to one or more other devices for evaluation of nomenclature of the self-sovereign identification and the tag-value structure.

Example 20 includes the subject matter of any one or more of Examples 11-19 and optionally includes a network interface to transmit the second data supply chain object to at least one of a blockchain or an object monitoring service to at least one of (a) enforce a contract corresponding to the data, (b) record revisions to the data, (c) enforce data provenance, or (d) track the data.

Example 21 includes a system to generate a data supply chain object, the apparatus comprising: means for deriving a provenance of a first data supply chain object and identifying a first stakeholder from the provenance; means for determining if the first stakeholder is verified and utilizing data associated with the data supply chain when the first stakeholder is verified; and means for building a tag-value structure based on the utilization of the data, building a second data supply chain object based on the tag-value structure and an identity of a second stakeholder, and adding the second data supply chain object to the data supply chain.

Example 22 includes the system of Example 21, further including means for transmitting the data and the second data supply chain object to a device that requested access to the data.

Example 23 includes the subject matter of any one or more of Examples 21 and/or 22 and optionally includes the means for deriving to derive the provenance based on a trusted third party privacy function.

Example 24 includes the subject matter of any one or more of Examples 21-23 and optionally includes means for selecting the second stakeholder identity based on self-sovereign identification.

Example 25 includes the subject matter of any one or more of Examples 21-24 and optionally includes the self-sovereign identification being developed by the second stakeholder.

Example 26 includes the subject matter of any one or more of Examples 21-25 and optionally includes the means for selecting to bypass a central repository to select the second stakeholder identity.

Example 27 includes the subject matter of any one or more of Examples 21-26 and optionally includes the means for selecting to verify priority of the self-sovereign identification to the second stakeholder.

Example 28 includes the subject matter of any one or more of Examples 21-27 and optionally includes the self-sovereign identification being a first self-sovereign identification, and the means for selecting to select a second self-sovereign identification when the second stakeholder lacks priority to the first self-sovereign identification.

Example 29 includes the subject matter of any one or more of Examples 21-28 and optionally includes means for transmitting the self-sovereign identification and the tag-value structure to one or more other devices for evaluation of nomenclature of the self-sovereign identification and the tag-value structure.

Example 30 includes the subject matter of any one or more of Examples 21-29 and optionally includes means for transmitting the second data supply chain object to at least one of a blockchain or an object monitoring service to at least one of (a) enforce a contract corresponding to the data, (b) record revisions to the data, (c) enforce data provenance, or (d) track the data.

Example 31 includes an apparatus to generate a data supply chain object, the apparatus comprising: processor circuitry; and a memory including instructions which, when executed, cause the processor circuitry to: derive a provenance of a first data supply chain object; identify a first stakeholder from the provenance; determine if the first stakeholder is verified; utilize data associated with the data supply chain when the first stakeholder is verified; build a tag-value structure based on the utilization of the data; build a second data supply chain object based on the tag-value structure and an identity of a second stakeholder; and add the second data supply chain object to the data supply chain.

Example 32 includes the apparatus of Example 31, wherein the instructions cause the processor circuitry to transmit the data and the second data supply chain object to a device that requested access to the data.

Example 33 includes the subject matter of any one or more of Examples 31 and/or 32 and optionally includes the instructions causing the processor circuitry to derive the provenance based on a trusted third party privacy function.

Example 34 includes the subject matter of any one or more of Examples 31-33 and optionally includes the instructions causing the processor circuitry to select the second stakeholder identity based on self-sovereign identification.

Example 35 includes the subject matter of any one or more of Examples 31-34 and optionally includes the self-sovereign identification being developed by the second stakeholder.

Example 36 includes the subject matter of any one or more of Examples 31-35 and optionally includes the instructions causing the processor circuitry to bypass a central repository to select the second stakeholder identity.

Example 37 includes the subject matter of any one or more of Examples 31-36 and optionally includes the instructions causing the processor circuitry to verify priority of the self-sovereign identification to the second stakeholder.

Example 38 includes the subject matter of any one or more of Examples 31-37 and optionally includes the self-sovereign identification being a first self-sovereign identification and the instructions causing the processor circuitry to select a second self-sovereign identification when the second stakeholder lacks priority to the first self-sovereign identification.

Example 39 includes the subject matter of any one or more of Examples 31-38 and optionally includes the instructions causing the processor circuitry to transmit the self-sovereign identification and the tag-value structure to one or more other devices for evaluation of nomenclature of the self-sovereign identification and the tag-value structure.

Example 40 includes the subject matter of any one or more of Examples 31-39 and optionally includes the instructions causing the processor circuitry to transmit the second data supply chain object to at least one of a blockchain or an object monitoring service to at least one of (a) enforce a contract corresponding to the data, (b) record revisions to the data, (c) enforce data provenance, or (d) track the data.

Example 41 includes a method for generating a data supply chain object, the method comprising: deriving, by executing an instruction with a processor, a provenance of a first data supply chain object; identifying, by executing an instruction with the processor, a first stakeholder from the provenance; determining, by executing an instruction with the processor, if the first stakeholder is verified; utilizing, by executing an instruction with the processor, data associated with the data supply chain when the first stakeholder is verified; building, by executing an instruction with the processor, a tag-value structure based on the utilization of the data; building, by executing an instruction with the processor, a second data supply chain object based on the tag-value structure and an identity of a second stakeholder; and adding, by executing an instruction with the processor, the second data supply chain object to the data supply chain.

Example 42 includes the method of Example 41, further including transmitting the data and the second data supply chain object to a device that requested access to the data.

Example 43 includes the subject matter of any one or more of Examples 41 and/or 42 and optionally includes deriving, by executing an instruction with the processor, the provenance based on a trusted third party privacy function.

Example 44 includes the subject matter of any one or more of Examples 41-43 and optionally includes selecting, by executing an instruction with the processor, the second stakeholder identity based on self-sovereign identification.

Example 45 includes the subject matter of any one or more of Examples 41-44 and optionally includes the self-sovereign identification being developed by the second stakeholder.

Example 46 includes the subject matter of any one or more of Examples 41-45 and optionally includes bypassing a central repository to select the second stakeholder identity.

Example 47 includes the subject matter of any one or more of Examples 41-46 and optionally includes verifying, by executing an instruction with the processor, priority of the self-sovereign identification to the second stakeholder.

Example 48 includes the subject matter of any one or more of Examples 41-47 and optionally includes the self-sovereign identification being a first self-sovereign identification, the method further including selecting, by executing an instruction with the processor, a second self-sovereign identification when the second stakeholder lacks priority to the first self-sovereign identification.

Example 49 includes the subject matter of any one or more of Examples 41-48 and optionally includes transmitting the self-sovereign identification and the tag-value structure to one or more other devices for evaluation of nomenclature of the self-sovereign identification and the tag-value structure.

Example 50 includes the subject matter of any one or more of Examples 41-49 and optionally includes transmitting the second data supply chain object to at least one of a blockchain or an object monitoring service to at least one of (a) enforce a contract corresponding to the data, (b) record revisions to the data, (c) enforce data provenance, or (d) track the data.

Example 51 is an edge computing gateway, comprising processing circuitry to perform any of Examples 41-50.

Example 52 is a base station, comprising a network interface card and processing circuitry to perform any of Examples 4-50.

Example 53 is a computer-readable medium comprising instructions to perform any of Examples 41-50.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable storage medium comprising instructions to cause processor circuitry to at least:
    derive a provenance of a first data supply chain object, the first data supply chain object linked to at least one of audio media, visual media, or audiovisual media;
    identify a first stakeholder from the provenance;
    determine if the first stakeholder is verified;
    utilize data associated with a data supply chain when the first stakeholder is verified;
    build a tag-value structure based on the utilization of the data, the tag-value structure indicative of a first change made to the at least one of the audio media, the visual media, or the audiovisual media by the first stakeholder;
    build a second data supply chain object based on the tag-value structure and an identity of a second stakeholder, the second data supply chain object linked to the at least one of the audio media, the visual media, or the audiovisual media;
    add the second data supply chain object to the data supply chain; and
    update the tag-value structure based on a second change made to the at least one of the audio media, the visual media, or the audiovisual media by the second stakeholder.

2. The computer readable storage medium of claim 1, wherein the instructions cause one or more of the at least one processor circuit to transmit the data and the second data supply chain object to a device that requested access to the data.

3. The computer readable storage medium of claim 1, wherein the instructions cause one or more of the at least one processor circuit to derive the provenance based on a trusted third party privacy function.

4. The computer readable storage medium of claim 1, wherein the instructions cause one or more of the at least one processor circuit to select the second stakeholder identity based on self-sovereign identification.

5. The computer readable storage medium of claim 4, wherein the self-sovereign identification is developed by the second stakeholder.

6. The computer readable storage medium of claim 4, wherein the instructions cause one or more of the at least one processor circuit to bypass a central repository to select the second stakeholder identity.

7. The computer readable storage medium of claim 4, wherein the instructions cause one or more of the at least one processor circuit to verify priority of the self-sovereign identification to the second stakeholder.

8. The computer readable storage medium of claim 7, wherein the self-sovereign identification is a first self-sovereign identification and the instructions cause one or more of the at least one processor circuit to select a second self-sovereign identification when the second stakeholder lacks priority to the first self-sovereign identification.

9. The computer readable storage medium of claim 4, wherein the instructions cause one or more of the at least one processor circuit to transmit the self-sovereign identification and the tag-value structure to one or more other devices for evaluation of nomenclature of the self-sovereign identification and the tag-value structure.

10. The computer readable storage medium of claim 1, wherein the instructions cause one or more of the at least one processor circuit to transmit the second data supply chain object to at least one of a blockchain or an object monitoring service to at least one of (a) enforce a contract corresponding to the data, (b) record revisions to the data, (c) enforce data provenance, or (d) track the data.

11. A system to generate a data supply chain object, the system comprising:
    machine readable instructions; and
    at least one processor circuit to be programmed based on the instructions to:
        derive a provenance of a first data supply chain object, the first data supply chain object linked to at least one of audio media, visual media, or audiovisual media;
        identify a first stakeholder from the provenance;
        build a tag-value structure based on utilization of data associated with a data supply chain, the tag-value structure including (1) a tag that identifies a change made to the at least one of the audio media, the visual media, or the audiovisual media by the first stakeholder and (2) a value that references at least one of an algorithm associated with the change or content incorporated by the change;
        build a second data supply chain object with the tag-value structure and an identity of a second stakeholder, the second data supply chain object linked to the at least one of the audio media, the visual media, or the audiovisual media; and
        add the second data supply chain object to the data supply chain.

12. The system of claim 11, further including a network interface to transmit the data and the second data supply chain object to a device that requested access to the data.

13. The system of claim 11, wherein one or more of the at least one processor circuit is to derive the provenance based on a trusted third party privacy function.

14. The system of claim 11, wherein one or more of the at least one processor circuit is to select the second stakeholder identity based on self-sovereign identification.

15. The system of claim 14, wherein the self-sovereign identification is developed by the second stakeholder.

16. The system of claim 14, wherein one or more of the at least one processor circuit is to bypass a central repository to select the second stakeholder identity.

17. The system of claim 14, wherein one or more of the at least one processor circuit is to verify priority of the self-sovereign identification to the second stakeholder.

18. The system of claim 17, wherein the self-sovereign identification is a first self-sovereign identification, and wherein one or more of the at least one processor circuit is to select a second self-sovereign identification when the second stakeholder lacks priority to the first self-sovereign identification.

19. The system of claim 14, including a network interface is to transmit the self-sovereign identification and the tag-value structure to one or more other devices for evaluation of nomenclature of the self-sovereign identification and the tag-value structure.

20. The system of claim 11 including a network interface to transmit the second data supply chain object to at least one of a blockchain or an object monitoring service to at least one of (a) enforce a contract corresponding to the data, (b) record revisions to the data, (c) enforce data provenance, or (d) track the data.

* * * * *